(12) United States Patent
Gage et al.

(10) Patent No.: US 9,801,099 B2
(45) Date of Patent: Oct. 24, 2017

(54) METHOD AND SYSTEM FOR USE OF CELLULAR INFRASTRUCTURE TO MANAGE SMALL CELL ACCESS

(71) Applicant: Research In Motion Limited, Waterloo (CA)

(72) Inventors: William Anthony Gage, Stittsville (CA); Biswaroop Mukherjee, Stittsville (CA)

(73) Assignee: BlackBerry Limited, Waterloo, CA (US)

( * ) Notice: Subject to any disclaimer, the term of this patent is extended or adjusted under 35 U.S.C. 154(b) by 597 days.

(21) Appl. No.: 13/895,037

(22) Filed: May 15, 2013

(65) Prior Publication Data

US 2014/0341182 A1 Nov. 20, 2014

(51) Int. Cl.
*H04W 36/00* (2009.01)
*H04W 12/04* (2009.01)
(Continued)

(52) U.S. Cl.
CPC ....... *H04W 36/0022* (2013.01); *H04W 12/04* (2013.01); *H04W 36/0016* (2013.01);
(Continued)

(58) Field of Classification Search
CPC . H04W 12/04; H04W 12/06; H04W 36/0016; H04W 36/0022; H04W 92/20;
(Continued)

(56) References Cited

U.S. PATENT DOCUMENTS 8,451,799 B2 * 5/2013 Yang et al. .................... 370/331
2005/0147068 A1 * 7/2005 Rajkotia ........... H04W 36/0061
370/338
(Continued)

FOREIGN PATENT DOCUMENTS

EP 2688363 A2 1/2014
WO 2011157152 A2 12/2011
(Continued)

OTHER PUBLICATIONS

Partial European search report, 46495-EP-EPA, Sep. 9, 2014.
(Continued)

*Primary Examiner* — Paul H Masur
*Assistant Examiner* — Michael Phillips
(74) *Attorney, Agent, or Firm* — Moffat & Co.

(57) ABSTRACT

A method and apparatus at a small cell access point for offloading a wireless device in a macro cell, the method establishing a radio link signaling connection between a base station of the macro cell and the access point; and offloading the wireless device using control signaling over the signaling connection. Further, a method at the wireless device, the method receiving a message identifying a set of candidate small cell access points; selecting at least one access point from amongst the set of candidate small cell access points; reporting the selected at least one access point; receiving a preparatory message preparing the wireless device for a target small cell access point, wherein the target small cell access point is included in the selected at least one access point; and associating the wireless device with the target small cell access point.

6 Claims, 12 Drawing Sheets

(51) Int. Cl.
| | |
|---|---|
| H04W 36/22 | (2009.01) |
| H04W 84/04 | (2009.01) |
| H04W 88/06 | (2009.01) |
| H04W 92/20 | (2009.01) |
| H04W 12/06 | (2009.01) |

(52) U.S. Cl.
CPC ........ *H04W 36/0066* (2013.01); *H04W 12/06* (2013.01); *H04W 36/22* (2013.01); *H04W 84/045* (2013.01); *H04W 88/06* (2013.01); *H04W 92/20* (2013.01)

(58) Field of Classification Search
CPC ... H04W 36/22; H04W 84/045; H04W 88/06; H04W 36/0066; H04W 36/04; H04W 72/04; H04W 84/12; H04W 12/08; H04W 36/14; H04W 48/16; H04W 36/00; H04W 36/16; H04W 36/08; H04W 48/00; H04W 88/08; H04W 92/00; H04W 84/042; H04W 36/0038; H04W 36/0083; H04W 92/045; H04W 28/0289; H04W 92/12; H04L 63/08; H04L 2463/061; H04L 63/06; H04L 9/00; H04L 2463/041; H04L 9/0816; H04L 63/062
USPC ................ 370/230, 235, 252, 331, 332, 338
See application file for complete search history.

(56) References Cited

U.S. PATENT DOCUMENTS

| | | | | |
|---|---|---|---|---|
| 2005/0255892 A1* | 11/2005 | Wong | .................. | H04B 7/2606 455/562.1 |
| 2007/0008929 A1* | 1/2007 | Lee | ....................... | H04W 36/26 370/331 |
| 2007/0016780 A1* | 1/2007 | Lee et al. | ....................... | 713/171 |
| 2007/0019598 A1* | 1/2007 | Prehofer | ............ | H04W 36/0055 370/338 |
| 2007/0060127 A1* | 3/2007 | Forsberg | .............. | H04L 63/061 455/436 |
| 2007/0110009 A1* | 5/2007 | Bachmann | .......... | H04L 12/2856 370/338 |
| 2007/0112967 A1* | 5/2007 | Lee et al. | ....................... | 709/229 |
| 2007/0121947 A1* | 5/2007 | Sood et al. | .................... | 380/277 |
| 2008/0219230 A1* | 9/2008 | Lee et al. | ....................... | 370/338 |
| 2009/0019284 A1* | 1/2009 | Cho et al. | ....................... | 713/170 |
| 2009/0022152 A1* | 1/2009 | Henry | ................ | H04L 29/1233 370/389 |
| 2009/0217043 A1* | 8/2009 | Metke | .................... | G06F 21/445 713/171 |
| 2010/0002883 A1* | 1/2010 | Sammour | ........... | H04L 63/1416 380/272 |
| 2010/0008293 A1* | 1/2010 | Gupta et al. | ................... | 370/328 |
| 2010/0138661 A1* | 6/2010 | Tsai et al. | ....................... | 713/171 |
| 2010/0189258 A1* | 7/2010 | Kassab | ................ | H04L 9/0822 380/247 |
| 2010/0279704 A1* | 11/2010 | Vachhani | ............... | H04W 48/06 455/453 |
| 2011/0047382 A1* | 2/2011 | Wang et al. | .................. | 713/170 |
| 2011/0080896 A1* | 4/2011 | Krishnamurthy | . | H04W 56/0045 370/336 |
| 2011/0096927 A1* | 4/2011 | Baek et al. | .................... | 380/270 |
| 2012/0069756 A1* | 3/2012 | Ji | ....................... | H04W 36/0016 370/252 |
| 2012/0183141 A1* | 7/2012 | Hapsari et al. | ............... | 380/272 |
| 2012/0263145 A1 | 10/2012 | Marinier | | |
| 2013/0088983 A1* | 4/2013 | Pragada et al. | ............. | 370/252 |
| 2013/0095789 A1* | 4/2013 | Keevill et al. | ................ | 455/411 |
| 2013/0171995 A1* | 7/2013 | Fujishiro | .............. | H04W 28/08 455/441 |
| 2013/0189971 A1* | 7/2013 | Callender | ......... | H04W 36/0094 455/423 |
| 2013/0198817 A1* | 8/2013 | Haddad et al. | .................... | 726/5 |
| 2013/0223421 A1* | 8/2013 | Gundavelli et al. | .......... | 370/338 |
| 2013/0242965 A1* | 9/2013 | Horn et al. | .................... | 370/338 |
| 2013/0244672 A1* | 9/2013 | Lin | ....................... | H04W 76/02 455/450 |
| 2013/0286826 A1* | 10/2013 | Park et al. | .................... | 370/230 |
| 2013/0343304 A1* | 12/2013 | Kaippallimalil et al. | .... | 370/329 |
| 2014/0050320 A1* | 2/2014 | Choyi | .................... | H04L 63/08 380/270 |
| 2014/0056243 A1* | 2/2014 | Pelletier | ................ | H04W 74/04 370/329 |
| 2014/0082697 A1* | 3/2014 | Watfa et al. | ....................... | 726/3 |
| 2014/0095864 A1* | 4/2014 | Dasgupta | ................ | H04L 45/64 713/155 |
| 2014/0120922 A1* | 5/2014 | Morioka | ............. | H04W 76/025 455/446 |
| 2014/0181904 A1* | 6/2014 | Craig et al. | ....................... | 726/3 |
| 2014/0206362 A1* | 7/2014 | Xu | ....................... | H04W 48/20 455/444 |
| 2014/0213219 A1* | 7/2014 | Mohebbi | ....................... | 455/411 |
| 2014/0273949 A1* | 9/2014 | Duggan et al. | ............... | 455/410 |
| 2014/0287717 A1* | 9/2014 | Golaup et al. | ................ | 455/411 |
| 2014/0349659 A1* | 11/2014 | Ishii | ............................... | 455/444 |
| 2014/0376515 A1* | 12/2014 | Lei et al. | ....................... | 370/331 |
| 2015/0023320 A1* | 1/2015 | Inakoshi | ............. | H04W 76/022 370/331 |
| 2015/0026775 A1* | 1/2015 | Kall et al. | ......................... | 726/4 |
| 2015/0031369 A1* | 1/2015 | Gunnarsson | .......... | H04W 36/04 455/438 |
| 2015/0040195 A1* | 2/2015 | Park | ....................... | H04W 12/06 726/4 |
| 2015/0045032 A1* | 2/2015 | Tomici et al. | ................. | 455/436 |
| 2015/0082393 A1* | 3/2015 | Chen | ................................ | 726/4 |
| 2015/0121490 A1* | 4/2015 | Liu et al. | ........................... | 726/6 |
| 2015/0319652 A1* | 11/2015 | Liu | ....................... | H04W 12/04 455/410 |

FOREIGN PATENT DOCUMENTS

| | | |
|---|---|---|
| WO | 2013010418 A1 | 1/2013 |
| WO | 2013040070 A1 | 3/2013 |

OTHER PUBLICATIONS

3GPP TS 23.402, "3rd Generation Partnership Project; Technical Specification Group Services and System Aspects; Architecture enhancements for non-3GPP accesses (Release 12)", v.12.0.0, Mar. 2013.

3GPP TS 23.327, "3rd Generation Partnership Project; Technical Specification Group Services and System Aspects; Mobility between 3GPP-Wireless Local Area Network (WLAN) interworking and 3GPP systems (Release 11) ", v. 11.0.0, Mar. 2013.

3GPP TS 23.234 "3rd Generation Partnership Project; Technical Specification Group Services and System Aspects; 3GPP system to Wireless Local Area Network (WLAN) interworking; System description (Release 11)" v. 11.0.0, Sep. 2012.

3GPP TS 23.335 "3rd Generation Partnership Project;Technical Specification Group Core Network and Terminals; User Data Convergence (UDC); Technical realization and information flows; Stage 2 (Release 11)", v. 11.0.0, Sep. 2012.

3GPP TS 24.312 "3rd Generation Partnership Project; Technical Specification Group Core Network and Terminals; Access Network Discovery and Selection Function (ANDSF) Management Object (MO) (Release 12)", v. 12.0.0, Mar. 2013.

3GPP TS 36.300, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", v. 11.5.0, Mar. 2013.

3GPP TS 36.321, "3rd Generation Partnership Project; Technical Specification Group Radio Access Network; Evolved Universal Terrestrial Radio Access (E-UTRA); Medium Access Control (MAC) protocol specification (Release 11)", v. 11.2.0, Mar. 2013.

3GPP TS 36.331, "3rd Generation Partnership Project; Technical Specification Group Radio Access Network; Evolved Universal

(56) References Cited

OTHER PUBLICATIONS

Terrestrial Radio Access (E-UTRA); Radio Resource Control (RRC); Protocol specification (Release 11)", v. 11.3.0, Mar. 2013.
IEEE Std 802.11™-2012 "Wireless LAN Medium Access Control (MAC) and Physical Layer (PHY) Specifications", Mar. 29, 2012.
IETF RFC 5213, "Proxy Mobile IPv6", Aug. 2008.
IETF RFC 6824, "TCP Extensions for Multipath Operation with Multiple Addresses", Jan. 2013.
3GPP TS 23.261, "3rd Generation Partnership Project; Technical Specification Group Services and System Aspects IP flow mobility and seamless Wireless Local Area Network (WLAN) offload; Stage 2 (Release 11)", v. 11.0.0, Sep. 2012.
Intel Corporation, "New Study Item Proposal on WLAN/3GPP Radio Interworking", 3GPP TSG-RAN Meeting #58, RP-121780, Dec. 2012.
3GPP TR 36.932, "3rd Generation Partnership Project; Technical Specification Group Radio Access Network; Scenarios and Requirements for Small Cell Enhancements for E-UTRA and E-UTRAN (Release 12)", v. 12.1.0, Mar. 2013, see in particular pp. 6-13.
3GPP TS 36.211, "3rd Generation Partnership Project; Technical Specification Group Radio Access Network; Evolved Universal Terrestrial Radio Access (E-UTRA); Physical Channels and Modulation (Release 11)", v.11.2.0, Feb. 2013.
3GPP TS 36.413 "3rd Generation Partnership Project; Technical Specification Group Radio Access Network; Evolved Universal Terrestrial Radio Access Network (E-UTRAN); S1 Application Protocol (S1AP) (Release 11)", v. 11.3.0, Mar. 2013.
IETF RFC 3985 "Pseudo Wire Emulation Edge-to-Edge (PWE3) Architecture", Mar. 2005.
3GPP TS 36.423 "3rd Generation Partnership Project; Technical Specification Group Radio Access Network; Evolved Universal Terrestrial Radio Access Network (E-UTRAN); X2 application protocol (X2AP) (Release 11)", v. 11.2.0, Sep. 2012.
CCITT I.321 "Integrated Services Digital Network (ISDN) Overall Network Aspects and Functions, ISDN User-Network Interfaces, B-ISDN Protocol Reference Model and Its Application", Apr. 5, 1991.
IETF RFC 5418 "Control and Provisioning of Wireless Access Points (CAPWAP) Threat Analysis for IEEE 802.11 Deployments", Mar. 2009.
IETF RFC 1918, "Address Allocation for Private Internets", Feb. 1996.
European Patent Office, Office Action for Application No. 14167349.1, issued on Sep. 5, 2016.
European Patent Office, Extended European Search Report for Application No. 14167349.1, issued on Jan. 14, 2015.
State Intellectual Property Office of the People's Republic of China, Office Action for Application No. 201410205542, issued on Mar. 2, 2017.
State Intellectual Property Office of the People's Repulic of China, English Translation of Form for Office Action for Application No. 201410205542, issued on Mar. 2, 2017.
State Intellectual Property Office of the People's Republic of China, English Translation of Remarks for Office Action for Application No. 201410205542, issued on Mar. 2, 2017.
European Patent Office, Office Action for Application No. 14167349.1, issued on May, 5, 2017.

\* cited by examiner

METHOD AND SYSTEM FOR USE OF CELLULAR INFRASTRUCTURE TO MANAGE SMALL CELL ACCESS

FIELD OF THE DISCLOSURE

The present disclosure relates to management of network access through a small cell and, in particular, relates to cellular control of network access through a wireless local area network (WLAN) access point.

BACKGROUND

Interaction between wide area cellular networks and wireless local area networks is currently handled by elements of the packet core network using higher layer protocols and procedures. For example, the elements of the packet core network may be the $3^{rd}$ Generation Partnership Project (3GPP) Long Term Evolution (LTE) S1 and S2 interfaces. For example, the LTE S1 interface is described in the 3GPP Technical Specification (TS) 36.413, *"Evolved Universal Terrestrial Radio Access Network (E-UTRAN); S1 Application Protocol (S1AP)"*, v.11.3.0, Mar. 18, 2013. The LTE S2 interface is described in 3GPP TS 23.402, *"Architecture enhancements for non-3GPP accesses"*, v.12.0.0, Mar. 8, 2013. The contents of both of TS 36.413 and TS 23.402 are incorporated herein by reference. Such access is beyond the scope of the radio access infrastructure in either of the WLAN or cellular networks.

Typically, communication between base stations and a cellular network involve signalling sent through backhaul facilities of the network infrastructure. Such interaction may be performed directly between base stations, for example through an LTE X2 interface, or may be performed indirectly via elements of the packet core network such as the LTE S1 interface. However, significant delays may be inherent in these interactions due to the physical topology of the network infrastructure, which may provide some impediment when trying to achieve tighter cooperation between the LTE macro cells and small cells, and for seamless mobility. One example of such a small cell is an Institute for Electrical and Electronics Engineers (IEEE) 802.11 network, commonly known as "WiFi". Such a network is, for example, described in IEEE 802.11-2012, *"Wireless LAN Medium Access Control (MAC) and Physical Layer (PHY) Specifications"*, March 2012, the contents of which are incorporated herein by reference.

Current solutions for interworking between the 3GPP cellular networks and 802.11 WLANs rely on the UE to make decisions regarding whether to attempt a network connection through a WLAN access point. After the UE has made such a decision, a network access via the WLAN is based on the evolved packet core (EPC) procedures rather than on the radio access network (RAN) procedures. As a consequence, a cellular network has little control over how, when or where the UE chooses to associate with the network, making it difficult to manage the use of the 802.11 small cells for traffic offload and to provide seamless mobility between LTE or other network technologies and the 802.11 or other similar technologies.

BRIEF DESCRIPTION OF THE DRAWINGS

The present disclosure will be better understood with reference to the drawings, in which.

DETAILED DESCRIPTION OF THE DRAWINGS

Figure 1:
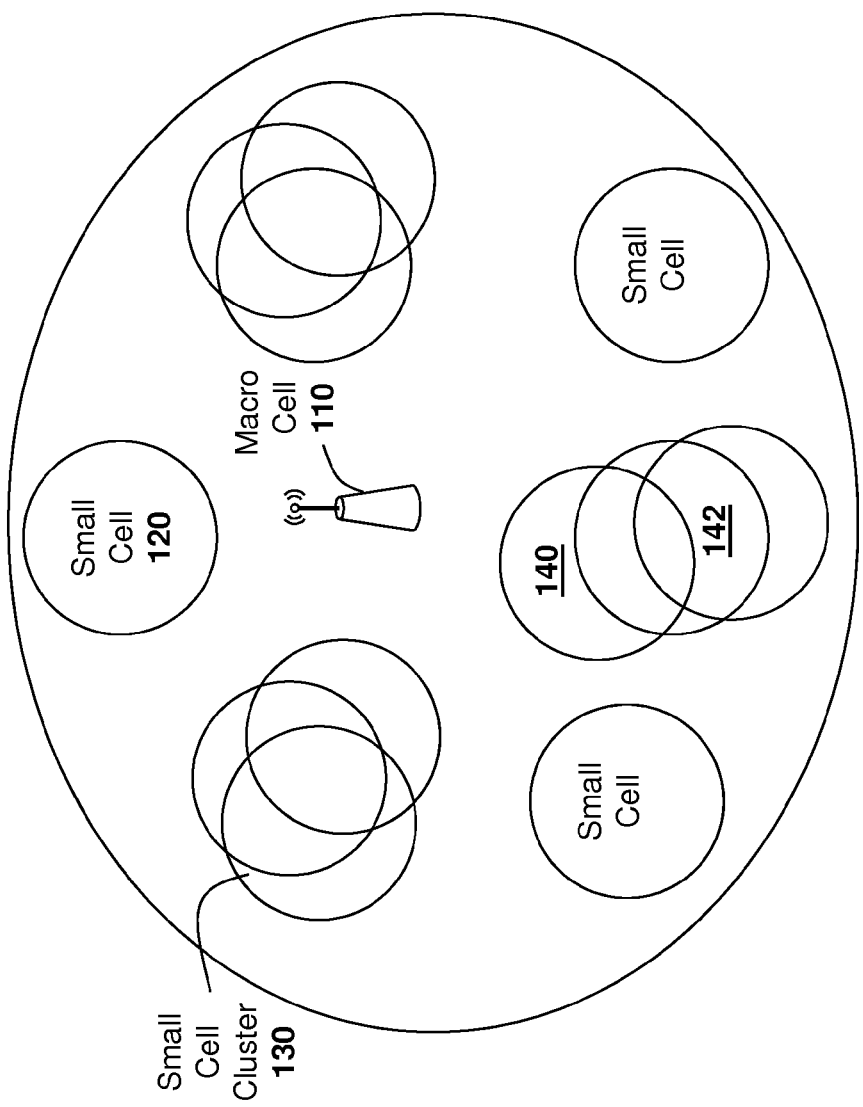
FIG. 1 is a block diagram showing exemplary configurations of small cells within a macro cell.

The present disclosure provides a method at a small cell access point for offloading a wireless device in a macro cell, the method comprising: establishing a radio link signaling connection between a base station of the macro cell and the small cell access point; and offloading the wireless device using control signaling over the radio link signaling connection.

The present disclosure further provides a small cell access point for offloading a wireless device in a macro cell, the small cell access point comprising: a processor; and a communications subsystem, wherein the small cell access point is configured to: establish a cellular radio link signaling connection between a base station of the macro cell and the small cell access point; and offload the wireless device using control signaling over the cellular radio link signaling connection.

The present disclosure further provides a method at a wireless device connected to a macro cell, the method comprising: receiving a message identifying a set of candidate small cell access points; selecting at least one small cell access point from amongst the set of candidate small cell access points; reporting the selected at least one small cell access point; receiving a preparatory message preparing the wireless device for a target small cell access point, wherein the target small cell access point is included in the selected at least one small cell access point; and associating the wireless device with the target small cell access point.

The present disclosure further provides a wireless device connected to a macro cell, the wireless device comprising: a processor; and a communications subsystem, wherein the wireless device is configured to: receive a message identifying a set of candidate small cell access points; select at least one small cell access point from amongst the set of candidate small cell access points; report the selected at least one small cell access point; receive a preparatory message preparing the wireless device for a target small cell access point, wherein the target small cell access point is included in the selected at least one small cell access point; and associate the wireless device with the target small cell access point.

To meet rising demand for wireless data, the current network model of high power outdoor macro cells may need to be augmented by lower power cells such as micro or pico cells. One example of a small cell is an 802.11 small cell, for example, as described in 3GPP TS 23.402, version 11.5.0, December 2012.

In wireless communications systems, capacity may be improved via both higher signal to interference noise ratio (SINR) and via greater spatial reuse of radio resources. In this regard, small cells directly increase spatial reuse and therefore increase system capacity. Such small cells may or may not deliver improved SINR dependent upon particular details of the deployment and interference environment in which they operate. If the SINR is improved, then the system capacity may be further increased.

However, the move towards smaller cells may increase the number of base stations in the system and lead to coverage overlap, both planned and unplanned between cells. For example, reference is now made to FIG. 1 which shows a macro cell 110 and a plurality of the small cells therein. Small cells may be standalone, as in small cell 120, or may be provided in a cluster as shown by cluster 130. In other cases, small cells may overlap such as small cells 140 and 142. Other examples are possible.

While the transmission and reception within a given cell may be coordinated by the base station responsible for that cell, operation across cell boundaries may be un-coordinated based on radio propagation, due to different administrative domains and/or due to the difficulties in communicating between base stations. However, completely un-coordinated operation may ultimately result in unacceptable levels of interference that could negate the benefits of improved signal levels that are achieved through the use of smaller cells. In these cases, active participation by a wireless device may be needed since the wireless device may be the only entity with visibility of all the radio conditions affecting it at a given location.

Small cells may be deployed to serve hotspots, for example as isolated cells such as small cell 120 in FIG. 1. They may also serve high density urban cores as cell clusters such as cluster 130. They may also serve as part of indoor venues either in isolated cells or clusters.

Small cells may also exploit heterogeneous radio access technologies and configurations. In particular, 802.11 Wireless LAN technology may be used as a small cell underlying an LTE macro cell described in 3GPP TS 36.300, *"Evolved Universal Terrestrial Radio Access (E-UTRA) and Evolved Universal Terrestrial Radio Access Network (E-UTRAN); Overall description; Stage 2"*, v. 11.5.0, Mar. 18, 2013, the contents of which are incorporated by reference. In this case, the 802.11 Access Point may be installed and managed by a cellular operator as an integral part of their coverage plan. In order to efficiently manage radio resources, offloading from a macro cell to a small cell may be controlled and directed by a centralized radio resource management entity associated with the macro cell.

As such, the present disclosure defines radio access network (RAN) based mechanisms for managing the interaction between the macro cell and an operator-controlled wireless local area network small cell. While the term "macro cell" is used throughout the present disclosure, the term may in general refer to any size of cellular cell. In accordance with the embodiments described, control plane signaling between entities related to the macro cell and small cell are transported over the air using radio resources of the macro cell, thus avoiding long delays inherent in the use of typical backhaul facilities. User plane traffic, which may require significant bandwidth, may be transported to and from the WLAN small cell using backhaul facilities of the network infrastructure.

The embodiments described herein may be used for moving traffic from cellular macro cells to a WLAN small cell (offloading) or for moving traffic from a WLAN small cell to a macro cell (onloading), and more generally for controlling mobility or handover between cellular cells and WLAN small cells, or between WLAN small cells. The mechanisms provided herein may also be used by the macro cell to control which Wireless Devices (WDs) are authorized to access the network through a WLAN small cell. Such authorization may use techniques described in IEEE 802.11-2012, for example.

The term "wireless device" is used within the present disclosure. A wireless device may also be referred to as a user equipment (UE) in the $3^{rd}$ Generation Partnership Project and as a wireless station (STA) in 802.11. Other terms for such devices may include mobile device, mobile station, smartphone or other such term. More generally, a wireless device includes both the cellular network and the 802.11 radio access technology (RAT) functionality.

Mobility management of a multi-RAT capable wireless device is handled by the macro cell using control plane signaling mechanisms of the cellular network, such as, but not limited to, radio resource control (RRC) signaling. Using signal quality measurements derived by a wireless device from access point beacons and cellular reference signals, a macro cell can direct the device to a preferred serving cell or access point.

Access or entry by the wireless device into the WLAN is facilitated by the macro cell through coordination with the access point via a cellular signaling link in some embodiments. In particular, selection and distribution of cryptographic keys, such as 802.11 keys, by the macro cell may ensure that only authorized devices gain access to the WLAN small cell.

The wireless connection between the small cell and the macro cell can be used to reduce system latency and reduce operational cost. Specifically, a small cell may typically not be co-located with a macro cell. This results in the small cell base station requiring its own backhaul facilities, as described below, that must interact with other network elements such as packet core entities and other base stations over those facilities. However, such small cell backhaul capabilities typically would have constrained bandwidth, significant delays, and multiple first/last mile technologies including fiber, DSL, cable, microwave, millimeter-wave, among others. Further, a backhaul in a cellular network typically utilizes facilities that are leased from a third party. For example, a metropolitan area common carrier may provide the backhaul facilities. As a result, backhaul costs for example based on the product bandwidth×distance, may represent a significant portion of a cellular operator's ongoing operational costs.

Figure 2:
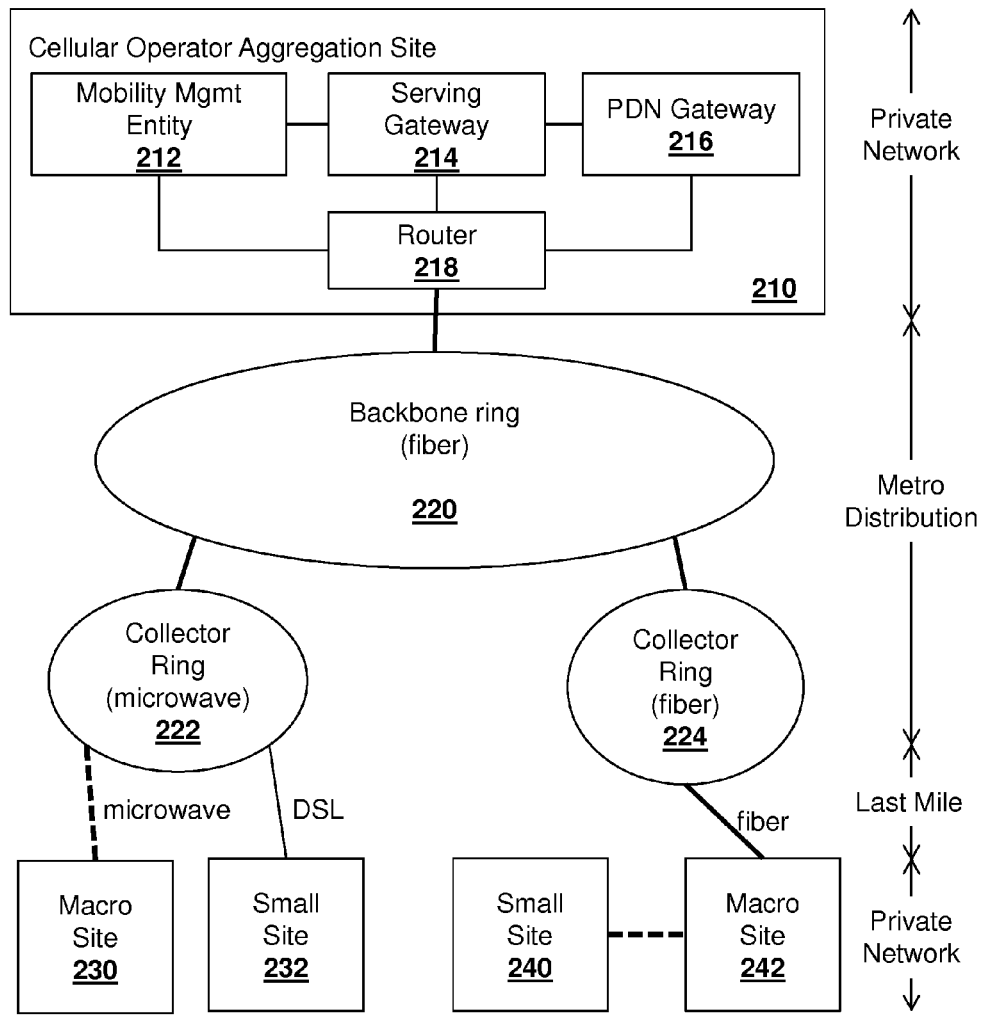
FIG. 2 is a block diagram showing an example architecture for carrier entities including a backhaul.

Reference is now made to FIG. 2, which shows an example topology for a cellular operation. In particular, a cellular operator aggregation site 210 may be run by the cellular operator and may include a mobility management entity 212, a serving gateway 214, a packet data network (PDN) gateway 216 and a router 218.

In the example of FIG. 2, a metropolitan area common carrier may provide the backhaul facility, including the use of a backbone ring 220, a collector ring such as microwave ring 222 and a fiber collector ring 224.

The evolved node Bs or other base stations may then communicate with the entities in cellular operator aggregation site 210 using various first/last mile links to connect to the collector rings. For example, a macro site 230 may use a microwave first/last mile link to communicate through the microwave collector ring 222. Similarly, a small site 232 may communicate, for example, over a DSL first/last mile link, with the microwave collector ring 222.

Similarly, a macro site 242 may use a fiber connection to fiber collector ring 224. A small site 240 may communicate through a millimeter wave connection to the fiber connection at the macro site 242.

The various macro and small sites are part of the private network for a cellular operator, as for example provided by the Internet Engineering Task Force (IETF) Request for Comments (RFC) 1918, "Address Allocation for Private Internets" February 1996, the contents of which are incorporated herein by reference. Similarly, the cellular operator aggregator site 210 is also part of the private network. However, communication between these entities must typically travel across the metro distribution and last mile, and this may cause significant delays.

Figure 3:
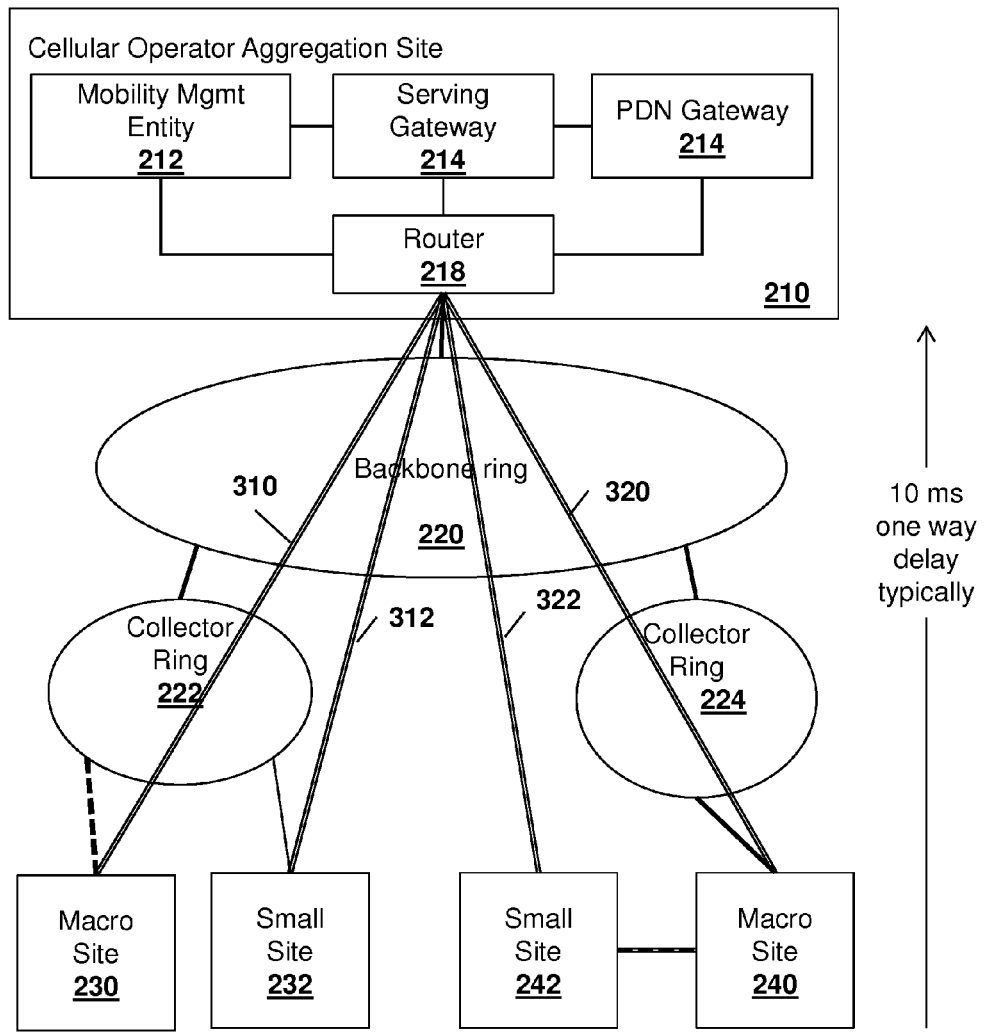
FIG. 3 is a block diagram showing signaling paths between the carrier entities of FIG. 2.

Reference is now made to FIG. 3. In particular, in FIG. 3, the topology of FIG. 2 is depicted with communications paths between elements of the private cellular operator network. If a macro site 230 communicates with a small site 232, then typically the metro distribution backhaul does not allow routing and would require a connection be made through the cellular operator aggregation site 210.

Typical delays for such communication each way are about 10 milliseconds, which could lead to a 20 millisecond delay for a single communication between a macro site and a small cell site. This is, for example, shown in Table 6-1-1 on page 8 of 3GPP TR 36.932, "3rd Generation Partnership Project; Technical Specification Group Radio Access Network; Scenarios and requirements for small cell enhancements for E-UTRA and E-UTRAN (Release 12)", v.12.1.0, March 2013. Specifically, while base stations are located at cell sites throughout the coverage area, other elements of the cellular network may be located at the central aggregation site. From the perspective of the metropolitan area common carrier, the cell sites and aggregation site of the cellular network represent end points of a private network.

A pseudo-wire connection (i.e. virtual point-to-point) through the metropolitan distribution network is used to transport traffic between end points of the private network. For example, pseudo-wire connections are described in IETF RFC 3985, "Pseudo Wire Emulation Edge-to-Edge (PWE3) Architecture" March 2005, and refers to an emulation of a point to point connection in a network. In other words, traffic is transported between the cell site and the aggregation site. This may also be referred to as a tunnelled connection.

From a cellular operator's perspective, there is no traffic routing or switching within the backhaul network. All traffic is delivered to and from and aggregation site. In other words, there is no direct physical connection between cell sites that does not pass through the aggregation site. Therefore, in order to send traffic from one cell site to another, the originating base station must send the traffic over the pseudo-wire connection to the aggregation site where the traffic is then redirected over the second pseudo-wire connection to the destination base station.

In the example of FIG. 3, a macro site 230 must send a communication to cellular operator aggregation site 210, shown by tunnel 310, and the cellular operator aggregation site 210 sends the message to small cell site 232, shown by tunnel 312. Similarly, if macro site 240 wants to communicate with small site 242, then a message is sent on tunnel 320 to cellular operator aggregation site 210, and cellular operator aggregation site 210 then send the message using tunnel 322 to small cell site 242.

One-way delays and throughput are shown in the example of Table 1 (following TR 36.932 cited above), which shows a typical expected throughput and latency.

TABLE 1

Exemplary Backhaul Characteristics

| Backhaul Technology | Latency (one way) | Throughput |
|---|---|---|
| Fiber Access 1 | 10-30 ms | 10M-10 Gbps |
| Fiber Access 2 | 5-10 ms | 100-1000 Mbps |
| DSL Access | 15-60 ms | 10-100 Mbps |
| Cable | 25-35 ms | 10-100 Mbps |
| Wireless Backhaul | 5-35 ms | 10 Mbps-100 Mbps |

As seen in Table 1, a typical delay for two directions may be between 50 and 100 milliseconds for each transaction. If a transaction has multiple communications, such delay may become too great to be practical.

For example, existing solutions for handovers between cellular base stations rely on signaling and data forwarding over an X2 interface (see, for example, 3GPP TS 36.423 v11.2.0 September 2012) between base stations. However, the X2 interface may require traversal on a pseudo-wire connection for uplink and another traversal for downlink. This produces a tromboning effect due to multiple traversals of the backhaul infrastructure, which not only increases delay but also increases the amount of bandwidth consumed in the backhaul network. Such increased bandwidth in turn increases the cost of the leased backhaul facilities.

The solutions provided by the embodiments described herein employ RAN-based mechanisms to reduce delays by using radio resources of a macro cell to provide direct signaling paths between a cellular base station and an underlying small cell WLAN Access Point.

Further, in current systems, a WD may discover a WLAN Access Point based on procedures executed at the WD with little or no input for the 3GPP Radio Access Network. For example, a WD may be configured with a list of Access Points and/or a list of Service Set Identifiers (SSID) that the WD may use to establish a connection with the network. This technique may be used, for example by cellular operators who rely on roaming agreements with third parties for supporting WLAN access. However, maintaining an up-to-date list of all SSIDs used by third-party providers may become very cumbersome and inconvenient.

In some cases, a WD may be programmed to query a database in order to identify an appropriate WLAN Access Point for use in establishing a connection with a network. This allows for more sophisticated policies and criteria other than Access Point identifiers and/or SSIDs to be used with the selection process. However, this technique still suffers based on the use of downloaded configurations. In this solution, there is no direct control by the 3GPP RAN.

Based on the above, a degree of RAN level control or influence may be beneficial for functions that would allow an eNB to interoperate with one or more operator deployed access points. While core network mechanisms exist for such functionality, there is need for tighter integration of the radio level control mechanisms.

In some cases, such control may for example allow for fast handovers or fast off-load/on-load of data in response to either the WD moving between small cell coverage areas of access points and the macro eNB, in response to wireless or backhaul load, or in response to the quality of experience (QoE) variations. In some embodiments provided herein, a network may direct or assist a WD to handover or otherwise offload some or all of its traffic to an access point with a low load and a good received signal strength indication (RSSI) at the WD. Assistance may also be provided to switch back to the eNB when the WD exits the coverage area or when the load on the cellular network has decreased. Further, in some modified architectures, the network could direct or assist the WD to offload to another one of the access points as the WD moves. Some of these control mechanisms may require lower delays that are available through certain backhaul networks such as those shown with regard to FIG. 2 above.

Therefore, in accordance with the present disclosure, a new or modified radio access network based mechanism may be provided for managing interaction between a macro cell and an operator-controlled WLAN small cell. Control plane signalling between entities in the macro cell and the small cell may be transported over-the-air using the radio resources of the macro cell, thereby avoiding long delays that may be inherent in the use of backhaul facilities, as described above. As defined in The International Telegraph And Telephone Consultative Committee (CCITT) I.321, 1991, the control plane has a layered structure and performs the call control and connection control functions; it deals with the signalling necessary to set up, supervise and release calls and connections. Various messages on this plane include signal strength measurement reports, automatic repeat request messaging, radio resource assignment, modulation and coding assignment, among others.

User plane traffic, which may require significant bandwidth, may be transported to and from the WLAN small cell using backhaul facilities of the network infrastructure. As defined in CCITT I.321, the user plane has a layered structure providing for user information flow transfer, along with associated controls (e.g. flow control, and recovery from errors, etc).

Figure 4:
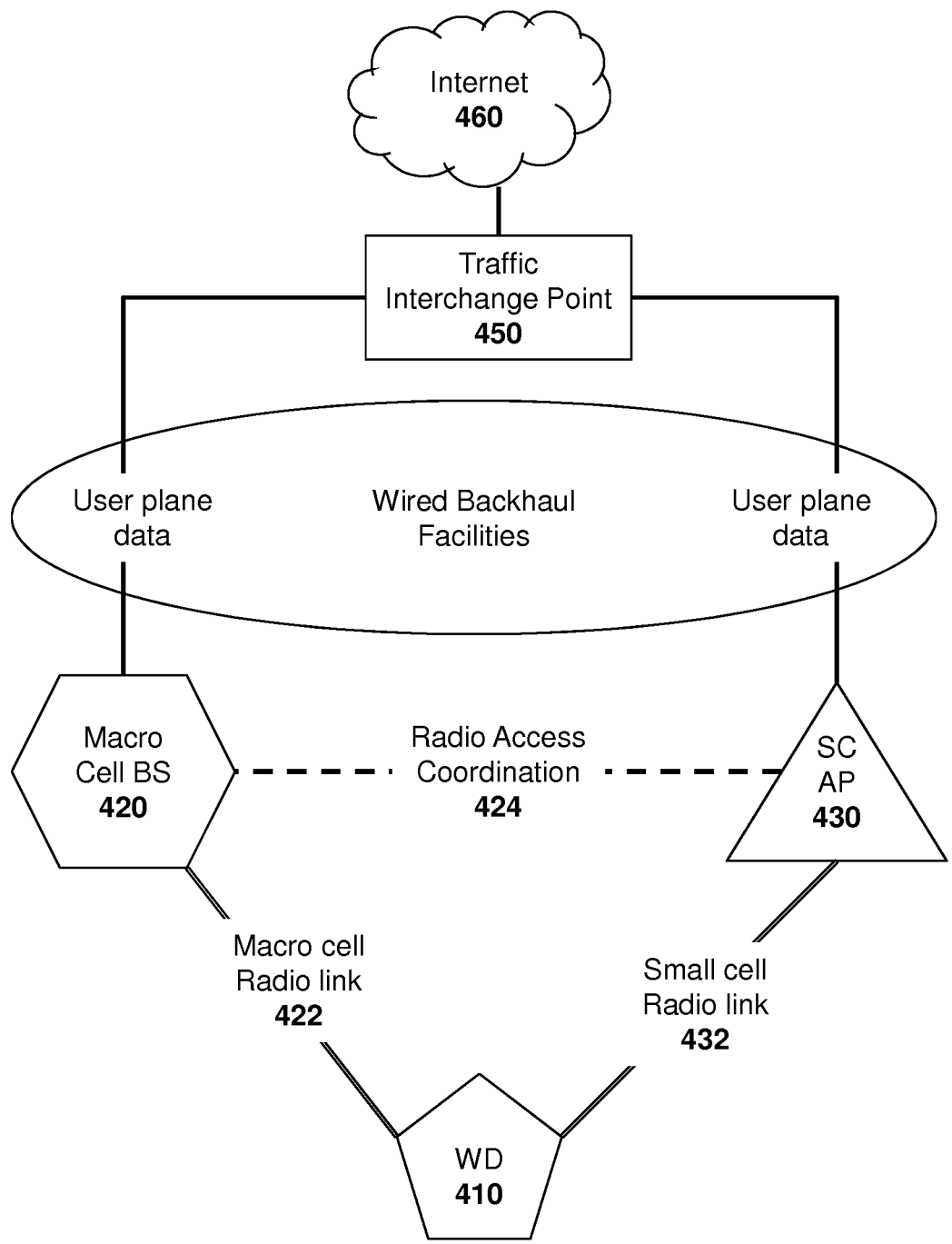
FIG. 4 is a block diagram showing an architecture of a system in accordance with the embodiments of the present disclosure.

A functional system architecture of one embodiment of the present disclosure is provided with reference to FIG. 4. As seen in FIG. 4, a wireless device 410 can communicate with both a macro cell base station 420 and a small cell access point 430. In particular, the communication between wireless device 410 and macro cell 420 uses a macro cell radio link 422. Similarly, the communication between the wireless device 410 and the small cell access point 430 uses a small cell radio link 432.

In accordance with the present disclosure, macro cell base station 420 has a radio access coordination link 424 between the macro cell base station 420 and the small cell access point 430. Radio access coordination 424 utilizes a cellular link between the macro cell and the small cell.

Each of macro cell base station 420 and small cell access point 430 have a backhaul connection with a traffic interchange point 450. Small cell access point 450 may then connect to various networks such as the Internet 460 or the cellular operator's private network.

The use of the split connection between the macro cell and the small cell sites, where control plane signalling travels over-the-air and user plane traffic travels over a wired backhaul, may help reduce delays encountered in offloading the wireless device to the small cell, as well as minimizing macro cellular radio resources required to redirect user data traffic to the small cell.

In one embodiment, access to both the macro cell and the small cell by a wireless device 410 with multiple radio access technology interfaces could be managed by a Radio Access Coordination Function (RACF) that is associated with the macro cell.

In the system architecture of the embodiments of the present disclosure, a small cell access point is subordinate to a macro cell base station and some action on the SCAP may be commanded by the macro cell. In some embodiments, this means that the small cell access point does not operate autonomously and does not offer access to devices at large, but instead the small cell access point provides service to wireless devices only, as directed by the RACF.

In other embodiments, operator policy may allow a small cell access point to serve wireless devices that have not been directed to the access point by the RACF, such as devices that do not have a connection to the macro cell.

Thus, in accordance with the present disclosure, a radio access coordination function (RACF) facilitates use of a WLAN small cell radio resource within a macro cell environment. This may be achieved through several procedures and mechanisms which include a way of communicating with a small cell access point using radio resources of the cellular network; reception of operational status from a Small Cell Access Point, the operational status comprising the current traffic load on the WLAN radio link; transmission of WLAN signal quality measurement instructions to a Wireless Device, the instructions including information to identify the subset of Small Cell Access Points within a potentially larger set of access of access points that are to be measured by the device; reception of WLAN signal quality measurements from the Wireless Device; transmission of off-loading directions to a Small Cell Access Point, the off-loading directions comprising the identity of an incoming Wireless Device, as described below with reference to FIG. 10, and the security credentials (e.g. pairwise master key described below) associated with that device; and transmission of off-loading directions to the Wireless Device, the off-loading directions comprising the identity of a target Small Cell Access Point and the security credentials associated with that access point.

In one embodiment, a Wireless Device may operate under the direction of the cellular network in order to gain network access through a WLAN Access Point. This may be achieved through several mechanisms and procedures, which may include: the reception of WLAN signal quality measurement instructions from a RACF, the instructions including information to identify a subset of Small Cell Access Points within a potentially larger set of Access Points that are to be measured by the Wireless Device; transmission of WLAN signal quality measurements to a RACF; reception of off-loading directions from the RACF, the off-loading directions comprising the identity of a target Small Cell Access Point and the security credentials associated with that Small Cell Access Point; and a way of gaining network access through the target Small Cell Access Point using the supplied security credentials.

Further the Small Cell Access Point may operate under the direction of the cellular network and provide network access to Wireless Devices using WLAN technology. This may be achieved through several procedures and mechanisms which may include: the ability to operate as a WLAN Access Point in order to communicate with multi-RAT capable Wireless Devices, a way to communicate with the RACF using radio resources of a cellular network; transmission of Small Cell Access Points operational status to an RACF, the operational status comprising current traffic load on the WLAN radio link; reception of off-loading directions from an RACF, the off-loading directions comprising the identity of an incoming Wireless Device and the security credentials associated with that Device; and a way of authenticating a network access attempt by an incoming Wireless Device using the supplied security credentials. These and other procedures are provided below.

Functional Small Cell Access Point (SCAP) Network Architecture

Figure 5:
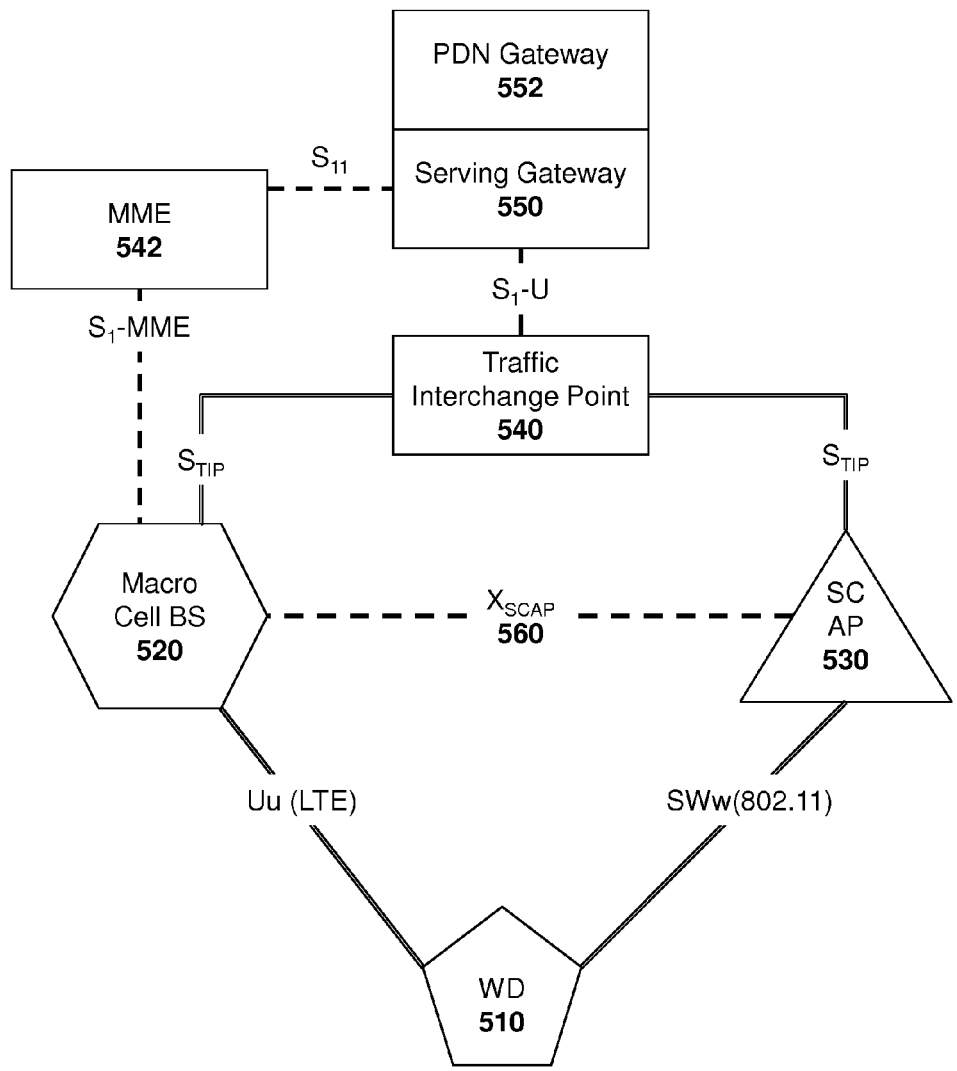
FIG. 5 is a block diagram showing the control and user plane connection interfaces in accordance with the embodiments of the present disclosure.

Reference is now made to FIG. 5, which shows the functional network architecture for the embodiments described herein.

In FIG. 5, a Wireless Device 510 may be equipped with multiple wireless network interfaces, each of which may support a different radio access technology (RAT). For example, the wireless device may be equipped with a wide-area cellular network interface such as an LTE interface and a local-area network interface such as an 802.11 interface. The device communicates with the macro cell base station 520 over a cellular radio link. The radio link may, for example, be an LTE logical Uu interface.

Device 510 further communicates with a small cell access point 530 over a wireless LAN radio link. For example the logical interface may be an LTE SWw interface.

The Wireless Device is able to communicate simultaneously with both the base station 520, also known as an eNB in LTE, and the small cell access point 530 over their respective interfaces.

In accordance with one embodiment of the present disclosure, under instructions from the RACF, the wireless device 510 is able to perform signal quality measurements related to transmissions from one or more SCAPs identified by the RACF. Under instructions from the RACF, the wireless device is then able to initiate a network access via the SCAP identified by the RACF and using security credentials provided by the RACF.

The macro cell eNB 520 provides wide area (high power) coverage that encompasses one or more small cell access points. The eNB maintains a wired backhaul connection to a traffic interchange point 540 using an interface identified as an $S_{TIP}$ interface in the present disclosure. Such interface may be used for transporting user plane data packets to and from the wireless devices that the macro cell eNB 520 serves.

The macro cell eNB also maintains a control plane connection over the backhaul facilities to a mobility management entity 542. For example, the interface between the macro cell eNB and the backhaul facilities may be an S1-MME interface.

The Radio Access Coordination Function associated with the macro cell eNB can instruct a wireless device to perform signal quality measurements related to transmissions from one or more SCAPs identified by the RACF. Contemporaneously, the RACF may receive reports from a SCAP with the domain of the macro cell regarding the current traffic load and other facets of operation.

Based on the reports from the SCAPs and from the wireless device, and possibly in coordination with the radio resource scheduler in the eNB, the RACF may direct a device 510 to connect to a SCAP 530 in order to offload traffic from the macro cell. Security credentials may be provided by the RACF to both the SCAP 530 and the device to enable the establishment of a trust relationship (for example as defined in IEEE 802.11-2012) between the SCAP 530 and the device 510.

A small cell access point 530 provides local area (low power) coverage utilizing a radio access technology such as 802.11, that is different from that utilized by the macro cell eNB. Power levels for such local area coverage are, for example, provided in the 3GPP TR 36.932 document cited above. However, the present disclosure is not limited to 802.11 for the SCAP, and other wireless radio access technologies could be utilized.

The SCAP is deemed to be a trusted non-3GPP network access point, meaning that the SCAP provides mechanisms to ensure that only authorized devices are granted access to the network.

The SCAP 530 maintains a backhaul connection which may be wired to a traffic interchange point 540, for example using a logical interface $S_{TIP}$. The interface transports user plane data packets to and from wireless devices that the SCAP 530 serves.

As seen in FIG. 5, the architecture does not provide an S1-MME control plane connection between SCAP 530 and the MME 542. As described below, the association with a small cell access point by a wireless device is controlled by the macro cell eNB 520, obviating the need for interaction with the MME 542 by the small cell access point.

A user plane-traffic interchange point (UP-TIP) 540 supports seamless mobility between the macro cell base stations and small cell access points by distributing downlink protocol data units (PDUs) to the serving macro cell 520 and small cell access points and aggregating uplink PDUs from the serving macro cell 520 and/or SCAP 530.

Architecturally the UP-TIP is a functional entity that may logically reside within the Evolved Universal Terrestrial Radio Access Network (E-UTRAN), operating under instructions from the RACF, but may physically reside in a cellular operator aggregation site and be co-located with, or integrated into, network elements of the Evolved Packet Core (EPC). The functional traffic interchange point, and its physical placement in a cellular operator aggregation site, eliminates the back and forth carriage of user plane traffic (i.e. tromboning effect) issues described above with regard to forwarding over the X2 interface.

As seen in FIG. 5, traffic interchange point 540 may have a logical connection to a serving gateway 550 or a PDN gateway 552 over an interface such as an S1-U interface.

Further, a new logical interface 560, called an $X_{SCAP}$ is provided in the embodiment of FIG. 5. The interface represents the control plane connection between the macro cell eNB 520 and small cell Access Point 530. The interface utilizes radio resources of the macro cell to establish and maintain an over-the-air connection between the eNB 520 and the SCAP 530. The interface is described in more detail below.

Figure 6:
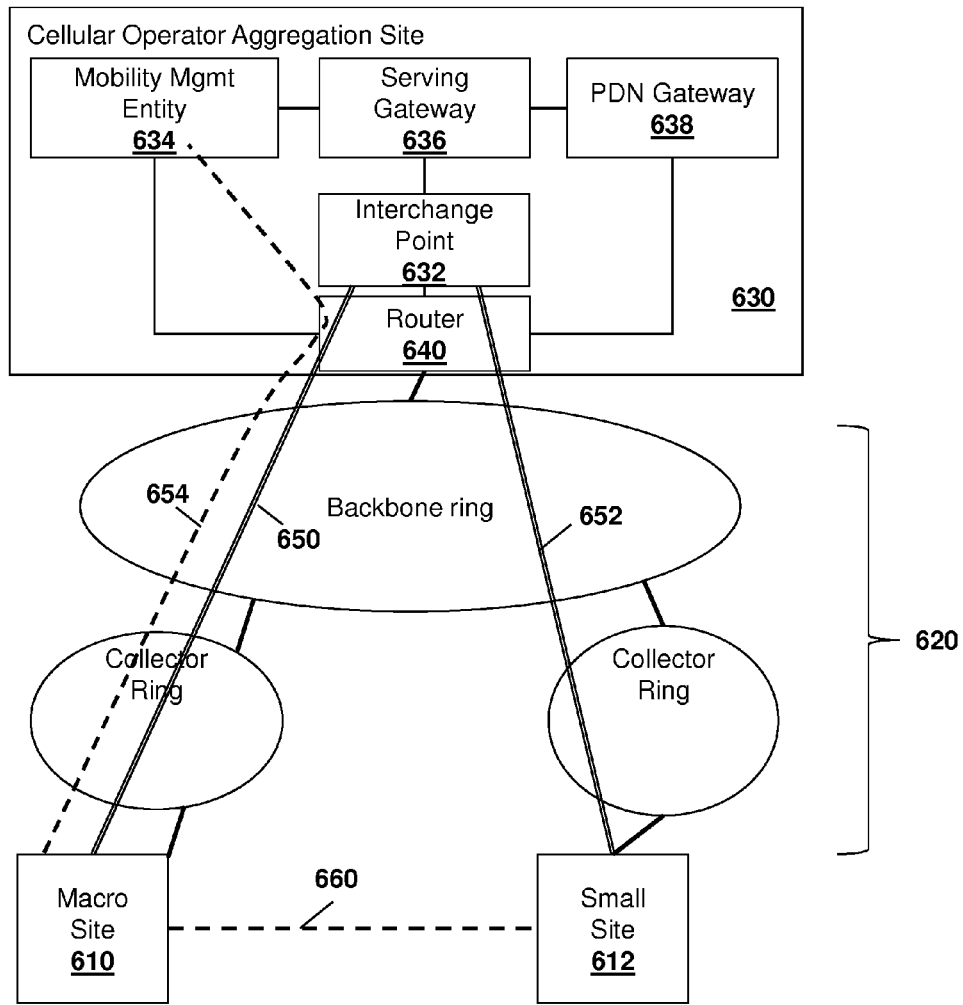
FIG. 6 is a block diagram showing signal paths for control and user plane data in accordance with one embodiment of the present disclosure.

Based on the above functional network architecture, reference is now made to FIG. 6, which shows a network model imposed on the model of FIG. 2. In particular, FIG. 6 shows a macro site 610 and small cell site 612.

The backhaul again utilizes a third party metropolitan operator and is shown with reference 620. A cellular operator aggregation site 630 includes a traffic interchange point 632 along with a mobility management entity (MME) 634, serving gateway 636 and PDN gateway 638. A router 640 routes traffic between elements of the cellular operator aggregation site 630, the macro site 610 and small cell site 612.

As seen with reference 650, user plane traffic between macro site 610 and traffic interchange point 632 travels through the backhaul 620. Similarly, as shown by reference 652, user plane traffic between small cell site 612 and interchange point 632 travels through the backhaul 620.

Further, as seen with reference 654, control plan traffic between macro site 610 and the mobility management entity 634 travels through the backhaul interface 620 to the mobility management entity 634.

In the embodiment of FIG. 6, however, control plane traffic for the small cell site 612 travels over the $X_{SCAP}$ interface 660. In the example of FIG. 6, such traffic has a very low delay and may, for example, be only 1 millisecond.

Functional SCAP Network Architecture

Figure 7:
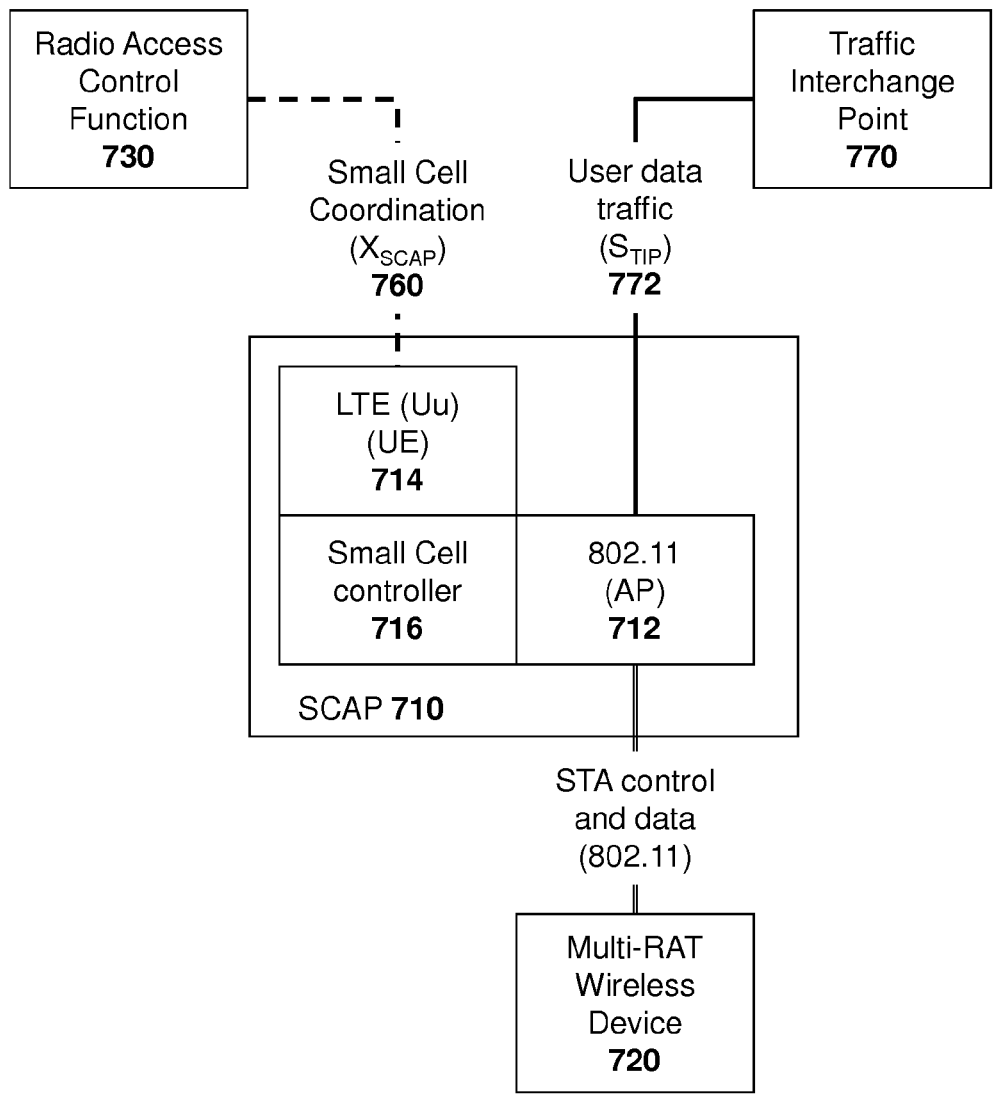
FIG. 7 is a block diagram showing logical entities within a small cell access point.

Reference is now made to FIG. 7, which shows a functional architecture of a small cell access point that can be used in accordance with one embodiment of the present disclosure. In particular, small cell access point 710 includes two wireless interfaces. A first interface is an 802.11 based access point interface 712, used to connect to a multi-RAT wireless device 720.

A second wireless interface is an LTE Uu interface 714 in the example of FIG. 7. However, if a different cellular architecture is used then the interface would be appropriate for that cellular connection. The LTE Uu interface 714 connects the SCAP to the radio access coordination function 730 at the eNB. As seen in FIG. 7, the interface between the LTE Uu interface and the RACF 730 is a small cell coordination connection identified as $X_{SCAP}$ in the present disclosure, and is shown with reference 760.

The 802.11 access point interface 712 further connects to a traffic interchange point 770 using a user data traffic connection identified as an $S_{TIP}$ connection 772. The backhaul interface used for $S_{TIP}$ may be connected to wired facilities such as DSL or fiber or to wireless facilities such as point-to-point microwave, for example.

The small cell Access Point 710 further has a small cell controller 716 to control traffic using interfaces 712 and 714.

From the perspective of the eNB, the radio link between the SCAP and the eNB may be a conventional LTE UE interface. Protocol data units of the $X_{SCAP}$ interface 760 are carried via the user plane of the LTE Uu interface connecting the SCAP to the eNB, while the control plane of the LTE Uu interface may be used for managing the radio link between the SCAP and the eNB.

An SCAP may have UE functionality in terms of interfacing with an eNB via the cellular radio link to receive downlink information, to transfer uplink information, to provide feedback and to receive cellular radio link configuration information. In this role, an SCAP shares the radio resources of the macro cell with the traffic to and from other UEs served by the eNB.

However, some aspects of SCAP operation may be different from those of a generic UE and may be exploited to optimize performance of an SCAP. In particular, an SCAP may be installed in a fixed location and in a first aspect the fixed location may obviate the need for mobility procedures.

Further, an SCAP may be connected to a power main, leading to a second aspect where the power source may obviate the need for battery saving procedures.

From the perspective of the 802.11 functionality, an SCAP may provide the functions defined for an 802.11 access point operating in an infrastructure mode. The 802.11 function of an SCAP may be comprised of one or more of: a single 802.11 access point; a cluster of 802.11 access points; or a wireless local area network (WLAN) controller.

Figure 8:
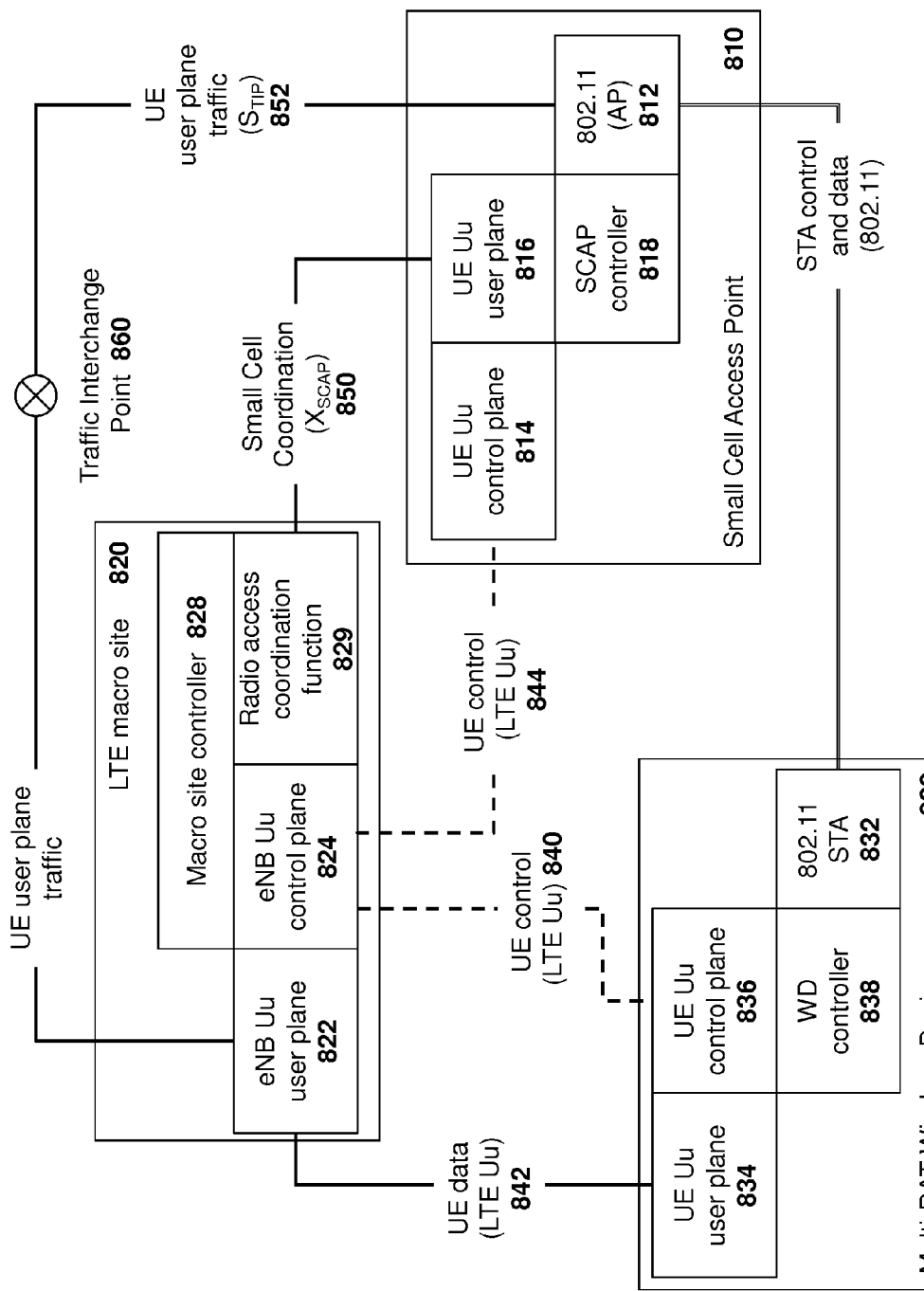
FIG. 8 is a block diagram showing logical entities within various components of the network system.

Reference is now made to FIG. 8, which shows a functional system model for each component of the systems described above. In particular, the small cell access point 810 includes an 802.11 access point 812. Further, a UE Uu control plane access functional block 814 and a UE Uu user plane functional block 816 are provided as part of the small Access Point 810. An SCAP controller 818 controls the functionality of the small cell access point 810.

An LTE macro site 820 includes an eNB Uu user plane functional block 822, an eNB Uu control plane functional block 824, and a radio access coordination function block 826. A macro site controller 828 controls the functionality of the LTE macro site 820.

A multi-RAT WD 830 includes an 802.11 station (STA) interface 832, an LTE UE Uu user plane block 834, an LTE UE Uu control plane block 836 and a WD controller 838.

The multi-RAT WD 830 may connect to the LTE macro site 820 for control plane traffic between the UE Uu control plane block 836 and the eNB Uu block 824 with an LTE Uu connection 840. Similarly, user plane data may be provided between UE Uu user plane block 834 and eNB Uu user plane block 822 over an LTE Uu interface 842.

Small cell access point 810 may further have a control plane connection between eNB Uu control plane 824 and UE Uu control plane 814 over an LTE Uu connection 844.

Further, as described below, the UE Uu user plane 816 may be used as transport for the $X_{SCAP}$ interface 850 between radio access coordination function block 829 and the SCAP controller 818.

802.11 access point 812 may have a user plane backhaul connection identified as an $S_{TIP}$ connection 852 to a traffic interchange point 860. Further, a backhaul connection may exist between the eNB Uu user plane 822 and traffic interchange point 860.

The multi-RAT WD 830 may connect to the small cell access block 812 using an STA control and data connection 870, which provides both control and data.

Figure 9:
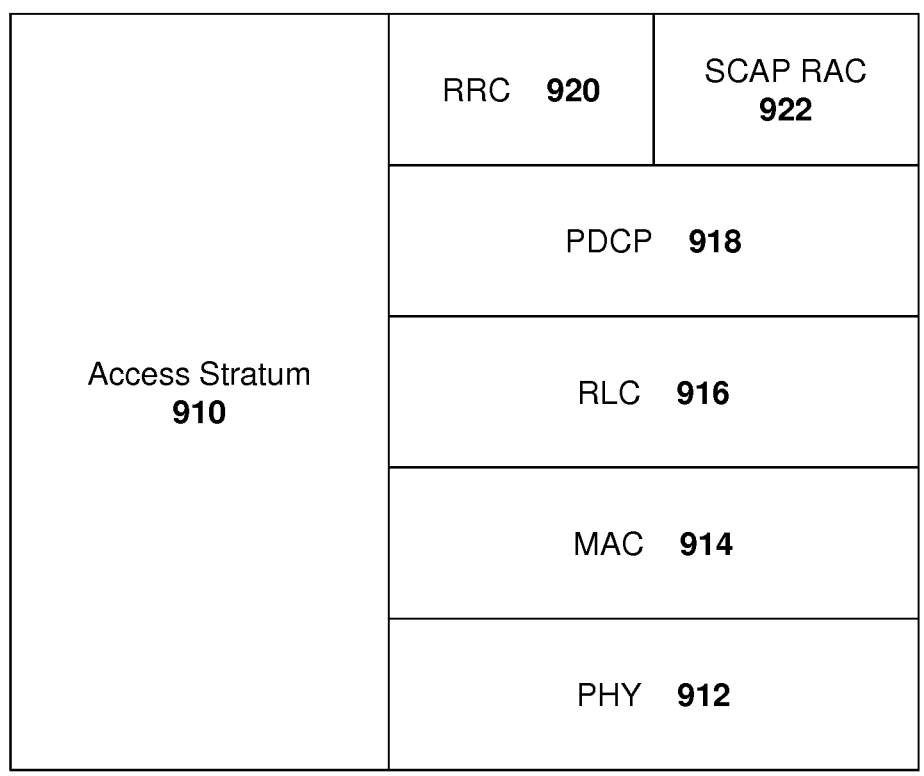
FIG. 9 is a block diagram showing a protocol stack.

The $X_{SCAP}$ logical interface may use a protocol stack such as that described below with regard to FIG. 9. As depicted in FIG. 9, the access stratum 910 is shown having a physical layer 912, a medium access control (MAC) layer 914, a radio link control (RLC) layer 916, a packet data convergence protocol (PDCP) layer 918 and a radio resource control (RRC) layer 920. Further, an SCAP radio access coordination (RAC) layer 922 is provided. The SCAP RAC layer 922 is shown to be within the access stratum and is used for information exchange between the RACF and the SCAP. Messages may be transported over the radio link using the PDCP and the RLC acknowledgement mode transport facilities of the Uu interface, for example.

Security Procedures

In accordance with one embodiment of the present disclosure, security procedures may be enhanced through the communication between the small cell access point and the macro cell. In particular, the ability of the RACF to communicate with both the wireless device and the small cell access point may allow for security procedures for a WD to be optimized when accessing the SCAP. The credentials of the wireless device are assumed to have been validated by the cellular network during the device's initial access to the network, creating a trust relationship between the device and the cellular network.

The trust relationship previously established between the RACF and the SCAP during the initialization of the SCAP, as described above, is used as the basis for the trust relationship between the device and the SCAP. In particular, the SCAP may accept the validation of the device performed by the cellular network, obviating the need to subject the Device to another validation of credentials when accessing the SCAP.

In order to prevent connection hijacking, there is a need to ensure that the WD that is accessing the SCAP is in fact the device that was authenticated and authorized by the cellular network. Connection hijacking is, for example, described in IETF RFC 5418, *"Control And Provisioning of Wireless Access Points (CAPWAP) Threat Analysis for IEEE 802.11 Deployments"*, March 2009, which defines the term as: "an adversary may assume the identity of one end of the connection and take over the conversation". Prevention of connection hijacking may be accomplished by using existing 802.11 procedures for authentication using a cached pairwise master key (PMK).

In particular, in accordance with the present embodiment, the PMK is not generated independently by the access point and the wireless device, but is instead dynamically generated by the RACF and distributed by the RACF to the SCAP and the wireless device. A new PMK is randomly generated by the RACF every time a wireless device attempts to associate with the SCAP.

Accordingly, the procedure increases the security by using randomly generated PMK that is not reused. Further, the procedure eliminates overhead of extensible authentication protocol (EAP)-based authentication procedures when accessing an SCAP.

Further, the procedure obviates a need for EAP negotiations and support in SCAP. The procedure also obviates a need for a Remote Authentication Dial In User Service (RADIUS) connection to the Authentication, Authorization, and Accounting (AAA) management server from the SCAP.

When the Wireless Device attempts to access an SCAP that has been directed by the RACF, the PMK furnished by the RACF may be used in a standard 802.11 4-way handshake, as described below, to provide mutual authentication and to generate temporal traffic encryption keys.

At the SCAP, security procedures may involve the initialization and configuration of the SCAP for operation as a trusted non-3GPP access network. The procedures for authentication may be similar to the procedures used for authenticating a UE that is attaching to a 3GPP network. Initialization and configuration of an SCAP for operation as an LTE user equipment follows procedures similar to those for a user equipment.

Once the SCAP has been initialized, a cellular radio link (Uu) between the RACF and the SCAP must be encrypted to at least protect distribution of the PMK from the RACF.

Using the architecture described above, various procedures may be provided for off-loading and on-loading the traffic to and from the macro cell. These procedures are described below.

Off-Loading from the Macro to the Small Cell

Figure 10:
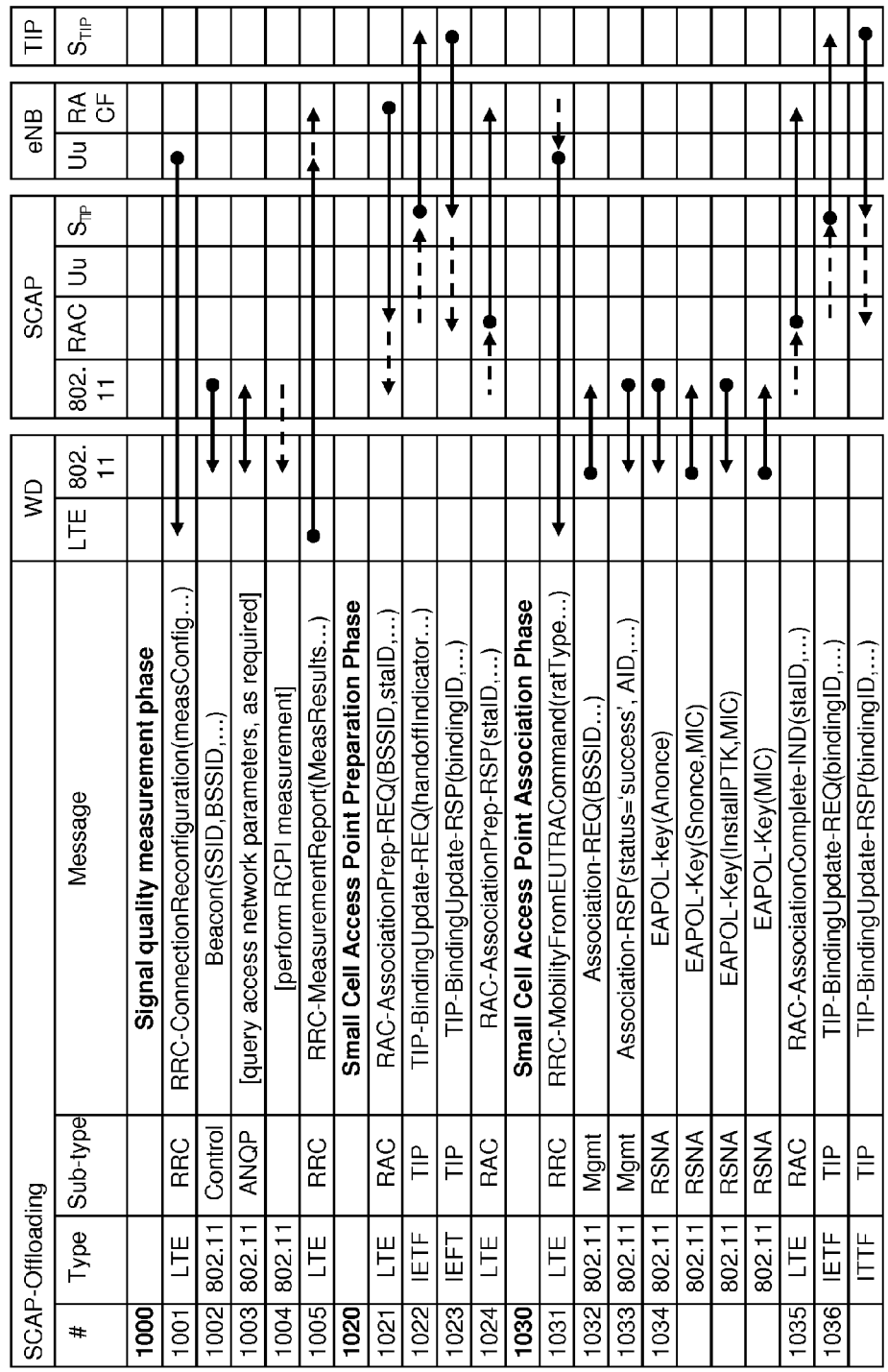
FIG. 10 is a table showing off-loading of a wireless device to small cell access point.

Reference is now made to FIG. 10, which shows an off-loading procedure from the macro to the small cell. In particular, as seen in FIG. 10, the procedure for off-loading a Wireless Device from the macro cell to the small cell is organized into four phases.

In a first phase (not shown in FIG. 10), wireless device capability and configuration information is exchanged, during which a Wireless Device reports both the LTE and 802.11 capabilities of the device to the eNB.

In a second phase 1000, signal quality measurement occurs, during which a wireless device discovers neighbouring 802.11 access points and reports the quality of the signal received from each of the candidate access points.

In a third phase 1020, small cell access point preparation occurs, during which the eNB configures the target SCAP to receive the wireless device.

During a fourth phase 1030, small cell access point association occurs, during which the wireless device associates with the target SCAP.

In the description below, it is assumed that the wireless device capability and configuration exchange occurs directly between the wireless device and the eNB. Thus, the description below discusses the second to the fourth phases.

Signal Quality Measurement

As seen in FIG. 10, in the second phase, identified in the table of FIG. 10 as signal quality measurement in row 1000, starts with row 1001, which shows that LTE Radio Resource Control signaling is used, via a cellular Uu interface, to configure a wireless device with information to perform signal quality measurements on neighboring cells.

Measurements from the small cell access points may be requested through an inclusion of an 802.11 measurement object information element, for example. Such a new information element may, for example, be amended from the current 3GPP Technical Specification (TS) 36.321, *"Evolved Universal Terrestrial Radio Access Network (E-UTRAN); Overall Description; Stage 2"*, v. 11.2.0, Mar. 18, 2013, the contents of which are incorporated herein by reference. The changes to this technical specification are shown in accordance with the bold portions in the example of Table 2 below.

TABLE 2

Measurement Object Information Element

```
MeasObjectToAddMod ::=    SEQUENCE {
    measObjectId                        MeasObjectId,
    measObject        CHOICE {
        measObjectEUTRA                 MeasObjectEUTRA,
        measObjectUTRA                  MeasObjectUTRA,
        measObjectGERAN                 MeasObjectGERAN,
        measObjectCDMA2000              MeasObjectCDMA2000,
        measObject80211                 MeasObject80211*,
        ...
    }
}
MeasObject80211* ::=      SEQUENCE {
    ssidToAddList                       80211_ssidList*,
    bssidToAddList                      80211_bssidList*,
    plmnToAddList                       80211_plmnList*,
    domainToAddList                     80211_domainList*,
    ...
    ssidToDeleteList                    80211_ssidList*,
    bssidToDeleteList                   80211_bssidList*,
    plmnToDeleteList                    80211_plmnList*,
    domainToDeleteList                  80211_domainList*,
    ...
```

TABLE 2-continued

Measurement Object Information Element

```
}
80211_ssidList*      ::= SEQUENCE (SIZE (1..maxCellMeas)) OF 80211_ssid*
80211_bssidList*     ::= SEQUENCE (SIZE (1..maxCellMeas)) OF 80211_bssid*
80211_plmnList*      ::= SEQUENCE (SIZE (1..maxCellMeas)) OF 80211_plmn*
80211_domainList*    ::= SEQUENCE (SIZE (1..maxCellMeas)) OF 80211_do-
                         main*
...
80211_ssid* ::=      SEQUENCE {
    ssidIndex                        INTEGER (1..Nssid),
    ssid                             CHARACTER (1..Mssid),
    priority                         INTEGER (1..maxCellMeas),
    ...
}
    80211_bssid* ::= SEQUENCE {
    bssidIndex                       INTEGER (1..Nbssid),
    bssid                            OCTET STRING (SIZE (6)),
    priority                         INTEGER (1..maxCellMeas),
    ...
}
80211_plmn* ::=      SEQUENCE {
    plmnIndex                        INTEGER (1..Nplmn),
    plmn                             PLMN-Identity,
    priority                         INTEGER (1..maxCellMeas),
    ...
}
80211_domain* ::=    SEQUENCE {
    domainIndex                      INTEGER (1..Ndomain),
    domain                           CHARACTER (1..Mdomain),
    priority                         INTEGER (1..maxCellMeas),
    ...
}
```

As seen in Table 2, the new measurement object 802.11 provides a sequence of SSIDs, BSSIDs, PLMNs and Domains to add to a list. The SSID, BSSID, PLMN and Domain identify one or more small cell Access Points that the Wireless Device is authorized to use. In particular, an SSID is the 802.11 Service Set Identifier associated with one or more candidate SCAPs. The BSSID is the 802.11 Basic Service Set Identifier associated with a candidate SCAP. The PLMN is the Public Land Mobile Network accessible through one or more candidate SCAPs. The Domain is the name of the Internet domain accessible through one or more candidate SCAPs.

Referring again to FIG. 10, in accordance with the row shown at 1002, the wireless device receives a beacon from a small cell access point over an 802.11 interface. In particular, the wireless device may scan for beacons that may be transmitted by neighboring 802.11 access points, some of which may be authorized as SCAPs and some of which may be unauthorized APs. If the BSSID and/or SSID broadcast by an access point matches one of those supplied in the measurement configuration, the discovered AP is flagged as a candidate SCAP.

With regard to Table 2 above, in some embodiments the measurement object may also include a list of APs to avoid. For example, this is shown as bssidToDeleteList, which may include a rogue access point (an access point which is setup by an attacker for the purpose of sniffing wireless network traffic) with a known BSSID that is broadcasting an authorized SSID. The spoofing of a legitimate BSSID is a potential threat but may also be caught during mutual authentication as described below.

As seen in Table 10 in row 1003, if the discovered AP is broadcasting support for an Interworking Service, the wireless device may use an existing 802.11 Access Network Query Protocol (ANQP) to determine the PLMNs and/or domains, as appropriate, that are accessible through the discovered AP. If one of the PLMNs and/or domains accessible through an Access Point matches one of those supplied in the measurement configuration, the discovered AP is flagged as a candidate SCAP.

As seen in FIG. 10 at step 1004, if one or more of the attributes of the discovered AP match the parameters configured by the eNB in the measurement object of row 1001, the wireless device may perform a received channel power indicator (RCPI) measurement using the beacon transmitted by the candidate AP.

The wireless device may then, in accordance with row 1005 of FIG. 10, report the measurements to the eNB. In one embodiment such report may be made through a cellular Uu interface using an RRC MeasurementReport. An example of an RRC MeasurementReport is provided with a new 802.11 measurement result information elements in bold in the example of Table 3 below.

TABLE 3

Measurement Results Information Element

```
MeasResults ::=      SEQUENCE {
    ...
    measResultNeighCells                    CHOICE {
        measResultListEUTRA                 MeasResultListEUTRA,
        measResultListUTRA                  MeasResultListUTRA,
        measResultListGERAN                 MeasResultListGERAN,
        measResultsCDMA2000                 MeasResultsCDMA2000,
        measResult80211                     MeasResults80211*,
        ...
    }
}
MeasResults80211* ::= SEQUENCE {
    bssid                                   OCTET STRING (SIZE (6)),
    priority                                INTEGER (1..maxCellMeas),
```

TABLE 3-continued

Measurement Results Information Element

```
    measResult    SEQUENCE {
        rcpi                    INTEGER (0..255),
        ...
    }
}
```

As seen in Table 3, the measResult80211 provides the RCPI of the observed Access Points.

Small Cell Access Point Preparation

In accordance with FIG. 10, the third phase, shown after row 1020, is the small cell Access Point preparation phase. This phase involves communication between the eNB and the small cell access point as well as communications between the small cell access point and the traffic interchange point.

In particular, based on the measurement reports received from the wireless device, the Radio Access Coordination Function in the eNB may select one or more small cell access points as targets for off-loading. An "association preparation request" message, as seen by row 1021 in the embodiment of FIG. 10, is an RAC-AssociationPrep-REQ message that is sent to one or more of the target SCAPs, via a cellular $X_{SCAP}$ interface. The message may include any of the following information: a target basic service set identifier (BSSID), which is a 48-bit IEEE medium access control (MAC) address that uniquely identifies the target AP; the wireless device 802.11 STA identifier, which is a 48-bit IEEE MAC address received in phase of the connection procedure that uniquely identifies the station; the 802.11 capabilities of the Wireless Device received in the preparation for the process; configuration parameters associated with the wireless device, including traffic-related information related to current radio bearers, multi-flow configuration, including the packet flows to be off-loaded to the SCAP and an indication of whether the device will continue to exchange user data packets through the macro cellular link; IP configuration including the IP address to be used by the wireless device within the domain of the small cell access point, which may or may not be the same as that used within the domain of the macro cell; and an identity of the UP-TIP serving the Device; and a Pairwise Master Key to be used for mutual authentication and for generation of transient 802.11 keys for encryption and authentication.

To prevent unauthorized access attempts and connection hijacking, the PMK may be randomly generated by the RCAF for each off-loading event and is never cached or reused by the wireless device or the SCAP.

On receipt of the association preparation request, the target SCAP may perform admission control to determine if it has capacity and ability to accept traffic from the identified device. In the SCAP is able to accept the wireless device, the SCAP may initiate redirection of the packet flows for the device to be off-loaded to the SCAP by sending a TIP Binding Update Request message to the serving UP-TIP, as shown at row 1022 of FIG. 10.

Once a Care of Address (CoA) binding, similar to that provided in IETF RFC 5213, *"Proxy Mobile IPv6"*, August 2008, has been updated, the Serving UP-TIP returns a TIP Binding Update Response to the target SCAP, as shown by row 1023 in the embodiment of FIG. 10. From this point on, downlink packets in the designated packet flows destined for the wireless device will be forwarded to both the SCAP and the eNB, and uplink packets from the wireless device will be accepted from both the SCAP and the eNB.

The UP-TIP may include functionality to ensure that user plane protocol data units (PDUs) are delivered in-sequence, that duplicate PDUs are discarded, and that lost PDUs are re-transmitted.

The SCAP may indicate its readiness to accept a wireless device by sending an "Association Preparation Response" message to the eNB, as shown by row 1024 in FIG. 10. The message is sent to the eNB via cellular $X_{SCAP}$ interface.

Small Cell Access Point Association

In the fourth phase, shown after row 1030, the wireless device is migrated to obtain user plane services from the SCAP. In particular, when an acknowledgement has been received from the SCAP, the Radio Access Coordination Function in the eNB may instruct the Wireless Device to associate with the target SCAP by sending an RRC Mobility Command (RRC-MobilityFromEUTRACommand) message to the Wireless Device, as shown by row 1031 in the embodiment of FIG. 10. The message is sent via a cellular Uu interface and includes an off-loading information element. For example, Table 4 shows the RRC Mobility Command with the new 802.11 offloading information elements in bold.

TABLE 4

RRC Mobility Command

```
MobilityFromEUTRACommand ::=    SEQUENCE {
    ...
    purpose                         CHOICE {
        handover                        Handover,
        cellChangeOrder                 CellChangeOrder,
        e-CSFB-r9                       E-CSFB-r9,
        offloadto802.11                 80211OffloadOrder*,
    }
    ...
}
80211OffloadOrder*::=            SEQUENCE {
    bssid                           OCTET STRING (SIZE (6)),
    pmk                             OCTET STRING (SIZE (32)),
    macroMode                       CHOICE {
        none                            OCTET STRING (SIZE (0)),
        connected                       PhysicalConfigDedicated,
        preamble                        RACH-ConfigDedicated,
        viaAP                           SignallingPathConfig*,
        ...
    }
    mobilityParameters              SEQUENCE {
        ipv6Address                     OCTET STRING (SIZE
                                        (16)),
        ...
    }
    bssCapabilities                 OCTET STRING,
    targetRAT-MessageContainer      OCTET STRING,
    ...
}
```

In Table 4 above, the BSSID is the 802.11 Basic Service Set Identifier associated with the target SCAP. The PMK is the Pairwise Master Key previously supplied to the SCAP by the eNB.

The macroMode identifies the macro cell resources allocated to the Device following successful association with the target SCAP. This may include one of: none, which indicates that the Wireless Device will not maintain an association with the macro eNB; connected, which indicates that the wireless device will maintain an association with the macro eNB using the specified LTE physical channel configuration; preamble, which indicates that the wireless device will not have any radio resources allocated in the macro cell but may use the assigned contention-free preamble to re-associate with the macro eNB; viaAP, which indicates that the wireless device will not have any radio resources allocated in the macro cell but may signal the macro eNB via the SCAP using the specified signaling path configuration.

Once the wireless device receives the RRC Mobility Message, the wireless device may attempt to associate with the target SCAP by transmitting an 802.11 Association Request that includes a Receiver STA Address containing the BSSID of the target SCAP; the Transmitting STA Address containing the 802.11 STA identifier of the Wireless Device; and Robust Security Network Element (RSNE) containing the PMKID derived from the PMK assigned by the eNB. Such message is shown by row 1032 in the embodiment of FIG. 10.

The target SCAP may verify the Association Request by ensuring that the Association Request contains a transmitting STA Address that matches a STA identifier previously authorized by the RACF. If a match is found, the SCAP also verifies that the PMKID received from the wireless device matches the PMK supplied by the RACF. If the verification is successful, the SCAP transmits an 802.11 Associates Response to the wireless device with a StatusCode set to, for example, "(0) success". This is shown by row 1033 in the embodiment of FIG. 10.

In some embodiments, the small cell access point may only accept associations that were preauthorized by the RACF. In these embodiments, the SCAP will not accept an association from an unauthorized STA and will respond to these requests with an 802.11 Associates Response, where the StatusCode is set to an unsuccessful value. For example, the unsuccessful value may be "(68) request refused because AP does not support unauthenticated access".

Once the transmitting STA Address and PMKID have been verified, the SCAP may initiate an 802.11 4-way handshake to provide mutual authentication of the SCAP and device, and to generate a set of temporary keys used for subsequent encryption and authentication of traffic over the small cell 802.11 access link. The 4-way handshake is shown with rows 1034 in the embodiment of FIG. 10.

Upon successful completion of the 4-way handshake, the SCAP may inform the RACF that the association with the wireless device has been completed by sending an Association Complete Indication (RAC-AssociationComplete-IND) message to the eNB via the cellular $X_{SCAP}$ interface, as shown by row 1035 in the embodiment of FIG. 10.

The SCAP confirms redirection of the traffic for the device by sending a TIP Binding Update Request message (TIP-BindingUpdate-REQ) to the serving UP-TIP for the packet flows to be off-loaded to the SCAP. This is shown with rows 1036 in the embodiment of FIG. 10. If the RACF indicated that the wireless device is configured for multi-flow operation, the TIP Binding Update Request message may designate a simultaneous care-of-address binding so that the UP-TIP continues to forward downlink traffic to, and accept uplink traffic from, both the SCAP and the eNB.

If the SCAP sends an Association Failure Indication (RAC-AssociationFailure-IND) message to the RACF via the cellular $X_{SCAP}$ interface to indicate that the association with the Wireless Device was not successful, for example if the Wireless Device does not attempt to associate with the SCAP, or mutual authentication fails, or if the RACF does not receive an indication from the SCAP within a predetermined time period, the RACF may instruct the eNB to send a TIP Binding Update Request message (TIP-BindingUpdate-REQ) to the serving UP-TIP indicating that downlink traffic should only be forwarded to the eNB.

The eNB, if it releases radio resources, may still provide the device with minimal periodic signaling resources to allow the device to request re-establishment of the cellular radio link. In some embodiments, this may comprise resources for a scheduling request (SR) with a suitably configured period between the physical uplink control channel (PUCCH) allocations. Alternatively, the eNB may release the cellular radio link signaling connection but provide the device with a dedicated random access preamble to allow rapid reattachment to the macro cell. In some embodiments, this may also comprise resources for a dedicated physical random access channel (PRACH), or a PRACH partition with a suitably configured period between PRACH allocations.

In a further embodiment, the eNB may release the cellular radio link signaling connection but provide the device with a means to signal the radio access coordination function in the macro cell via the SCAP. This signaling path may be via the cellular radio link between the RACF and the SCAP or it may be via the wired backhaul infrastructure. The signaling path chosen for the particular signal may be dependent on the nature of the signal. For example, low volume signals with low delay requirements may be sent via the cellular radio link while all other signals may be sent via backhaul infrastructure.

In another embodiment, the Wireless Device may maintain simultaneous active user plane and control plane connections to both the macro cell base station and the small cell Access Point, allowing user data traffic to be sent over both connections in parallel.

Off-Loading from the Small Cell

In a second configuration, the wireless device may be off-loaded from the small cell back to the macro cell or to a different small cell. If the eNB defined the macroMode as "connected" or "viaAP" when off-loading a wireless device to a small cell access point, then the eNB may continue to direct the connectivity of the device. The eNB may decide to change the connectivity of the wireless device for various reasons. These may include the degradation of the signal quality reported by the wireless device, increasing traffic load on the small cell access point that is currently serving the device, increased traffic load in the macro cell currently serving the device in the case of a simultaneous connections through the macro and small cells or decreasing traffic load at the macro cell which would allow devices to be served by the macro cell and allow the potential deactivation of the small cell access point. Depending on the situation, the eNB may initiate a change in connectivity to another small cell access point or back to the serving macro cell.

Thus for a handover to another SCAP, the signal quality reports from the Wireless Device may be used to find a candidate target SCAP to handover. In this case, a similar situation to that described with regard to FIG. 10 may be utilized.

In a second scenario, on-loading to the serving macro cell may be performed. In this case, various information, such as traffic loading reports from the SCAP, may be provided to the RACF via the $X_{SCAP}$. Further signal quality reports from the wireless device may be utilized. Similarly, signal quality reports from the serving SCAP may also be utilized. The decision to on-load is taken by the RACF based on a policy configuration or when directed by the SCAP.

The above may be implemented by any UEs and network elements.

Figure 11:
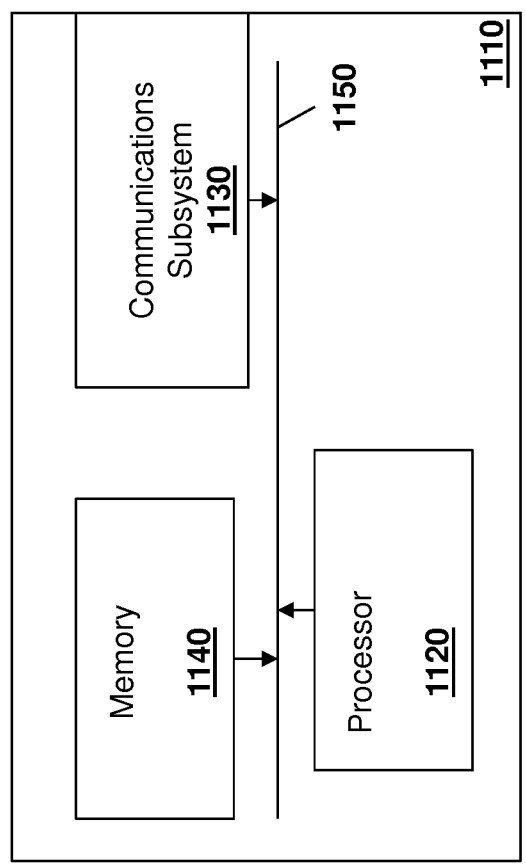
FIG. 11 is a block diagram showing a simplified network element.

In particular, the eNBs and network elements in the embodiments of FIGS. 1 to 10 above can be any network element, or part of any network element, including various network servers. Reference is now made to FIG. 11, which shows a generalized network element.

In FIG. 11 network element 1110 includes a processor 1120 and a communications subsystem 1130, where the processor 1120 and communications subsystem 1130 cooperate to perform the methods of the embodiments described above.

Processor 1120 is configured to execute programmable logic, which may be stored, along with data, on network element 1110, and shown in the example of FIG. 11 as memory 1140. Memory 1140 can be any tangible storage medium.

Alternatively, or in addition to memory 1140, network element 1110 may access data or programmable logic from an external storage medium, for example through communications subsystem 1130.

Communications subsystem 1130 allows network element 1110 to communicate with other network elements.

Communications between the various elements of network element 1110 may be through an internal bus 1150 in one embodiment. However, other forms of communication are possible.

Further, the above embodiments may be implemented by any wireless device. One exemplary device is described below with regard to FIG. 12.

Device 1200 is typically a two-way wireless communication device having voice and data communication capabilities. Depending on the exact functionality provided, the device may be referred to as a data messaging device, a two-way pager, a wireless e-mail device, a cellular telephone with data messaging capabilities, a wireless Internet appliance, a wireless device, a mobile device, or a data communication device, as examples.

Where device 1200 is enabled for two-way communication, it may incorporate a communication subsystem 1211, including both a receiver 1212 and a transmitter 1214, as well as associated components such as one or more antenna elements 1216 and 1218, local oscillators (LOs) 1213, and a processing module such as a digital signal processor (DSP) 1220. As will be apparent to those skilled in the field of communications, the particular design of the communication subsystem 1211 will be dependent upon the communication network in which the device is intended to operate.

Network access requirements will also vary depending upon the type of network 1219. In some networks network access is associated with a subscriber or user of UE 1200. A device may require a removable user identity module (RUIM) or a subscriber identity module (SIM) card in order to operate on a CDMA network. The SIM/RUIM interface 1244 is normally similar to a card-slot into which a SIM/RUIM card can be inserted and ejected. The SIM/RUIM card can have memory and hold many key configurations 1251, and other information 1253 such as identification, and subscriber related information.

Figure 12:
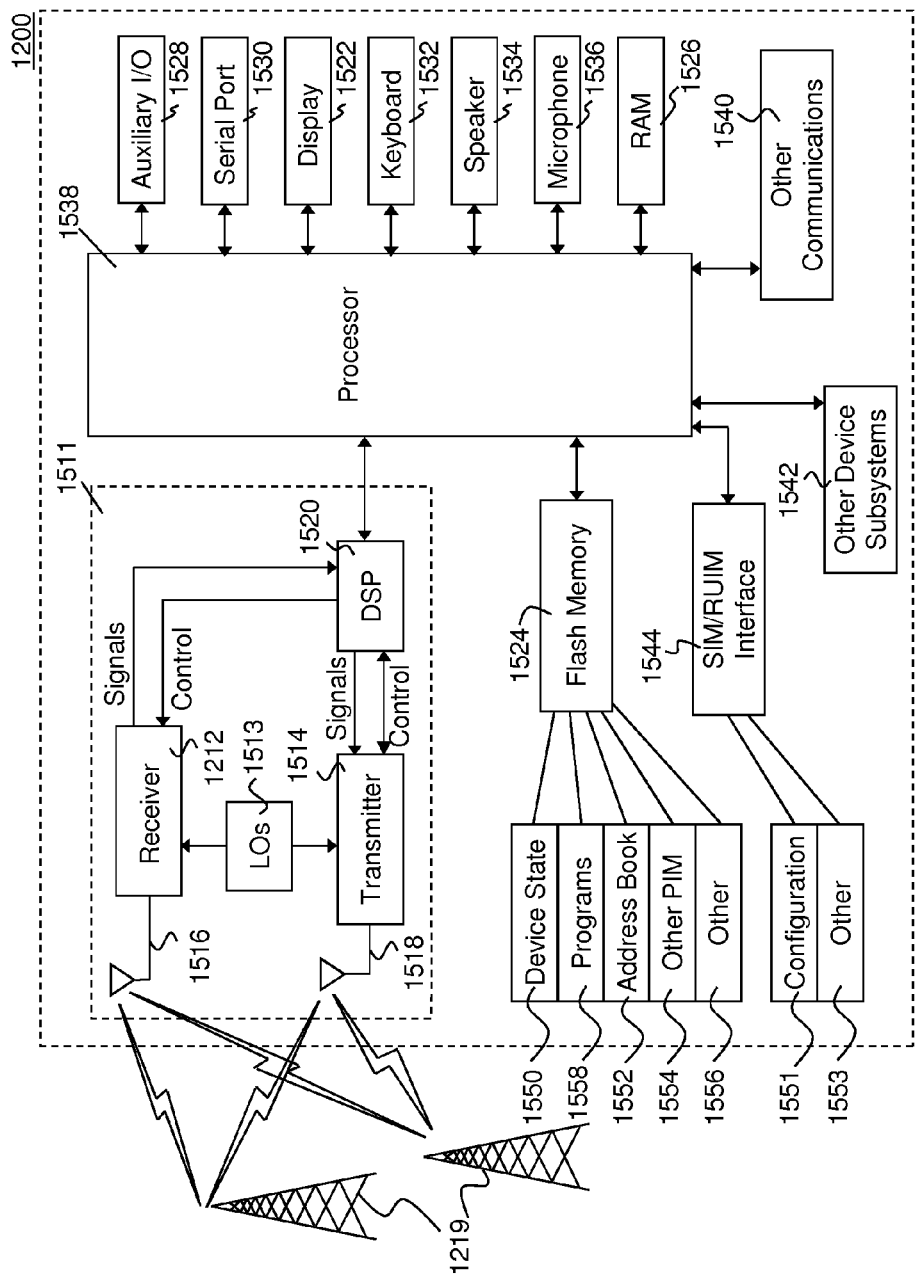
FIG. 12 is a block diagram showing an example wireless device for use with the embodiments with the present disclosure.

When required network registration or activation procedures have been completed, device 1200 may send and receive communication signals over the network 1219. As illustrated in FIG. 12, network 1219 can consist of multiple base stations communicating with the device.

Signals received by antenna 1216 through communication network 1219 are input to receiver 1212, which may perform such common receiver functions as signal amplification, frequency down conversion, filtering, channel selection and the like. A/D conversion of a received signal allows more complex communication functions such as demodulation and decoding to be performed in the DSP 1220. In a similar manner, signals to be transmitted are processed, including modulation and encoding for example, by DSP 1220 and input to transmitter 1214 for digital to analog conversion, frequency up conversion, filtering, amplification and transmission over the communication network 1219 via antenna 1218. DSP 1220 not only processes communication signals, but also provides for receiver and transmitter control. For example, the gains applied to communication signals in receiver 1212 and transmitter 1214 may be adaptively controlled through automatic gain control algorithms implemented in DSP 1220.

Device 1200 generally includes a processor 1238 which controls the overall operation of the device. Communication functions, including data and voice communications, are performed through communication subsystem 1211. Processor 1238 also interacts with further device subsystems such as the display 1222, flash memory 1224, random access memory (RAM) 1226, auxiliary input/output (I/O) subsystems 1228, serial port 1230, one or more keyboards or keypads 1232, speaker 1234, microphone 1236, other communication subsystem 1240 such as a short-range communications subsystem and any other device subsystems generally designated as 1242. Serial port 1230 could include a USB port or other port known to those in the art.

Some of the subsystems shown in FIG. 12 perform communication-related functions, whereas other subsystems may provide "resident" or on-device functions. Notably, some subsystems, such as keyboard 1232 and display 1222, for example, may be used for both communication-related functions, such as entering a text message for transmission over a communication network, and device-resident functions such as a calculator or task list.

Operating system software used by the processor 1238 may be stored in a persistent store such as flash memory 1224, which may instead be a read-only memory (ROM) or similar storage element (not shown). Those skilled in the art will appreciate that the operating system, specific device applications, or parts thereof, may be temporarily loaded into a volatile memory such as RAM 1226. Received communication signals may also be stored in RAM 1226.

As shown, flash memory 1224 can be segregated into different areas for both computer programs 1258 and program data storage 1250, 1252, 1254 and 1256. These different storage types indicate that each program can allocate a portion of flash memory 1224 for their own data storage requirements. Processor 1238, in addition to its operating system functions, may enable execution of software applications on the device. A predetermined set of applications that control basic operations, including at least data and voice communication applications for example, will normally be installed on UE 1200 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the device such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 1219. Further applications may also be loaded onto the UE 1200 through the network 1219, an auxiliary I/O subsystem 1228, serial port 1230, short-range communications subsystem 1240 or any other suitable subsystem 1242, and installed by a user in the RAM 1226 or a non-volatile store (not shown) for execution by the processor 1238. Such flexibility in application installation increases the functionality of the device and may provide enhanced on-device functions, communication-related functions, or both. For example, secure communication applications may enable electronic commerce functions and other such financial transactions to be performed using the device 1200.

In a data communication mode, a received signal such as a text message or web page download will be processed by the communication subsystem 1211 and input to the processor 1238, which may further process the received signal for output to the display 1222, or alternatively to an auxiliary I/O device 1228.

A user of device 1200 may also compose data items such as email messages for example, using the keyboard 1232, which may be a complete alphanumeric keyboard or telephone-type keypad, among others, in conjunction with the display 1222 and possibly an auxiliary I/O device 1228. Such composed items may then be transmitted over a communication network through the communication subsystem 1211.

For voice communications, overall operation of device 1200 is similar, except that received signals would typically be output to a speaker 1234 and signals for transmission would be generated by a microphone 1236. Alternative voice or audio I/O subsystems, such as a voice message recording subsystem, may also be implemented on UE 1200. Although voice or audio signal output is generally accomplished primarily through the speaker 1234, display 1222 may also be used to provide an indication of the identity of a calling party, the duration of a voice call, or other voice call related information for example.

Serial port 1230 in FIG. 12 would normally be implemented in a personal digital assistant (PDA)-type device for which synchronization with a user's desktop computer (not shown) may be desirable, but is an optional device component. Such a port 1230 would enable a user to set preferences through an external device or software application and would extend the capabilities of device 1200 by providing for information or software downloads to device 1200 other than through a wireless communication network. The alternate download path may for example be used to load an encryption key onto the device through a direct and thus reliable and trusted connection to thereby enable secure device communication. As will be appreciated by those skilled in the art, serial port 1230 can further be used to connect the UE to a computer to act as a modem or for charging.

Other communications subsystems 1240, such as a short-range communications subsystem, is a further component which may provide for communication between device 1200 and different systems or devices, which need not necessarily be similar devices. For example, the subsystem 1240 may be a WiFi communications system to connect to the access points in the embodiments described above. Further, other subsystems may include an infrared device and associated circuits and components or a Bluetooth™ communication module to provide for communication with similarly enabled systems and devices.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method at a small cell access point of a network for offloading a wireless device in a macro cell of the network, the method comprising:
   establishing a radio link signaling connection between a base station of the macro cell and the small cell access point; and
   adding the small cell access point to the wireless device using control signaling received over the radio link signaling connection, the adding comprising:
      signaling over the radio link signaling connection to determine whether the small cell access point has capacity to service the wireless device;
      receiving a pairwise master key from the base station, the pairwise master key being randomly generated at the base station upon said adding
      receiving an association request from the wireless device; and
      authenticating the wireless device using the pairwise master key and data from the association request; and
   establishing a backhaul connection between the small cell access point and a traffic interchange point for user plane traffic;
   wherein the establishing the radio link signaling connection results in the small cell access point becoming a trusted entity for the macro cell, wherein becoming the trusted entity comprises ensuring that only authorized devices are granted access to the network; and
   wherein the radio link signaling connection carries control plane traffic for the wireless device between the small cell access point and the base station of the macro cell.

2. The method of claim 1, wherein the small cell access point communicates with wireless devices over an 802.11 interface.

3. The method of claim 1, further comprising:
   receiving an association preparation message from the base station of the macro cell; and
   using information within the association preparation message to bind user plane traffic for the wireless device from-the traffic interchange point to the small cell access point.

4. The method of claim 1, further comprising signaling to the base station of the macro cell over the radio link signaling connection once authentication is complete.

5. A small cell access point for offloading a wireless device in a macro cell, the small cell access point and the macro cell being part of a network, comprising:
   a processor; and
   a communications subsystem,
   wherein the small cell access point is configured to:
      establish a radio link signaling connection between a base station of the macro cell and the small cell access point; and
      add the small cell access point to the wireless device using control signaling received over the radio link signaling connection, the adding comprising:
         signaling over the radio link signaling connection to determine whether the small cell access point has capacity to service the wireless device;
         receiving a pairwise master key from the base station, the pairwise master key being randomly generated at the base station upon adding;

receiving an association request from the wireless device; and authenticating the wireless device using the pairwise master key and data from the association request; and establish a backhaul connection between the small cell access point and a traffic interchange point for user plane traffic;

wherein the establishing the radio link signaling connection results in the small cell access point becoming a trusted entity for the macro cell, wherein becoming the trusted entity comprises ensuring that only authorized devices are granted access to the network; and wherein the radio link signaling connection carries control plane traffic for the wireless device between the small cell access point and the base station of the macro cell.

6. The small cell access point of claim 5, wherein the small cell access point is further configured to:

receive an association preparation message from the base station of the macro cell; and use information within the association preparation message to bind user plane traffic for the wireless device from the traffic interchange point to the small cell access point.

* * * * *